(12) United States Patent
Baghdasarian

(10) Patent No.: US 8,876,062 B1
(45) Date of Patent: Nov. 4, 2014

(54) SHAPE MEMORY ALLOY PRE-LOADED DEPLOYMENT HINGE

(71) Applicant: Space System/Loral, Inc., Palo Alto, CA (US)

(72) Inventor: Varouj G. Baghdasarian, Cupertino, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 188 days.

(21) Appl. No.: 13/665,722

(22) Filed: Oct. 31, 2012

(51) Int. Cl.
*B64G 1/22* (2006.01)

(52) U.S. Cl.
USPC ............... 244/172.6; 244/173.1; 244/173; 16/231

(58) Field of Classification Search
USPC ............... 244/172.6, 173.1, 173.2, 173
See application file for complete search history.

(56) References Cited

U.S. PATENT DOCUMENTS

| | | | | |
|---|---|---|---|---|
| 5,060,888 A * | 10/1991 | Vezain et al. | ............... | 244/173.3 |
| 5,192,058 A * | 3/1993 | VanDalsem et al. | ............ | 269/24 |
| 5,674,027 A * | 10/1997 | Warnaar | ........................ | 403/404 |
| 6,126,371 A * | 10/2000 | McCloskey | ................... | 411/82.5 |
| 6,175,989 B1 * | 1/2001 | Carpenter et al. | ............... | 16/225 |
| 6,772,479 B2 * | 8/2004 | Hinkley et al. | .................. | 16/225 |
| 6,889,411 B2 * | 5/2005 | Hinkley et al. | .................... | 29/11 |
| 7,594,299 B2 * | 9/2009 | Kilpinen | .......................... | 16/225 |
| 8,282,153 B2 * | 10/2012 | Browne et al. | .............. | 296/146.9 |
| 8,393,581 B2 * | 3/2013 | Keller et al. | ............... | 244/172.2 |
| 8,540,297 B2 * | 9/2013 | Browne et al. | ............. | 296/24.34 |
| 8,540,452 B2 * | 9/2013 | Jimenez et al. | ............... | 403/220 |
| 8,616,613 B2 * | 12/2013 | Browne et al. | ............. | 296/146.9 |
| 2003/0196298 A1 * | 10/2003 | Hinkley et al. | ................. | 16/385 |
| 2012/0112010 A1 * | 5/2012 | Young et al. | ................ | 244/173.1 |
| 2014/0042275 A1 * | 2/2014 | Abrams et al. | ............. | 244/172.6 |

OTHER PUBLICATIONS

"Deployable Booms," Astro-und Feinwerktechnik Adlershof GmbH, 2000, 3 pages, www.astrofein.com/2728/dwnld/admin/Deployable_Booms.pdf.

* cited by examiner

*Primary Examiner* — Christopher P Ellis
*Assistant Examiner* — Medhat Badawi
(74) *Attorney, Agent, or Firm* — Weaver Austin Villeneuve & Sampson

(57) ABSTRACT

Latching or locking deployment hinges are provided that include a shape-memory alloy (SMA) pre-load device configured to induce a pre-load across a contact interface of the latching hinge in a direction substantially perpendicular to the hinge pivot axis when the latching hinge is in a closed condition. The hinges may be sprung or actuated using a powered drive mechanism. Some implementations may feature a sprung latch/hook that is tensioned using the SMA pre-load device. Some other implementations may feature a multi-bar linkage that is tensioned using the SMA pre-load device.

20 Claims, 19 Drawing Sheets

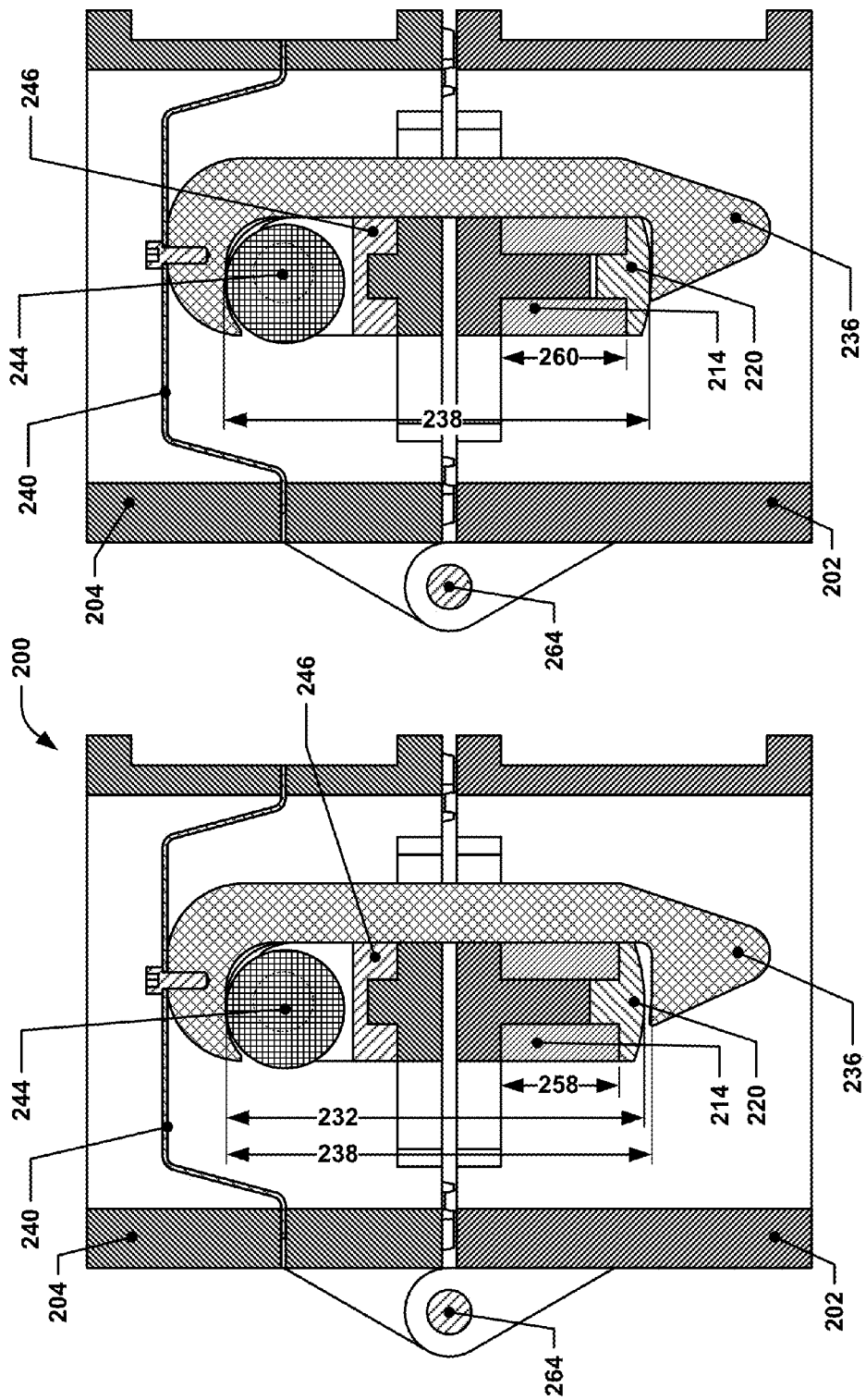

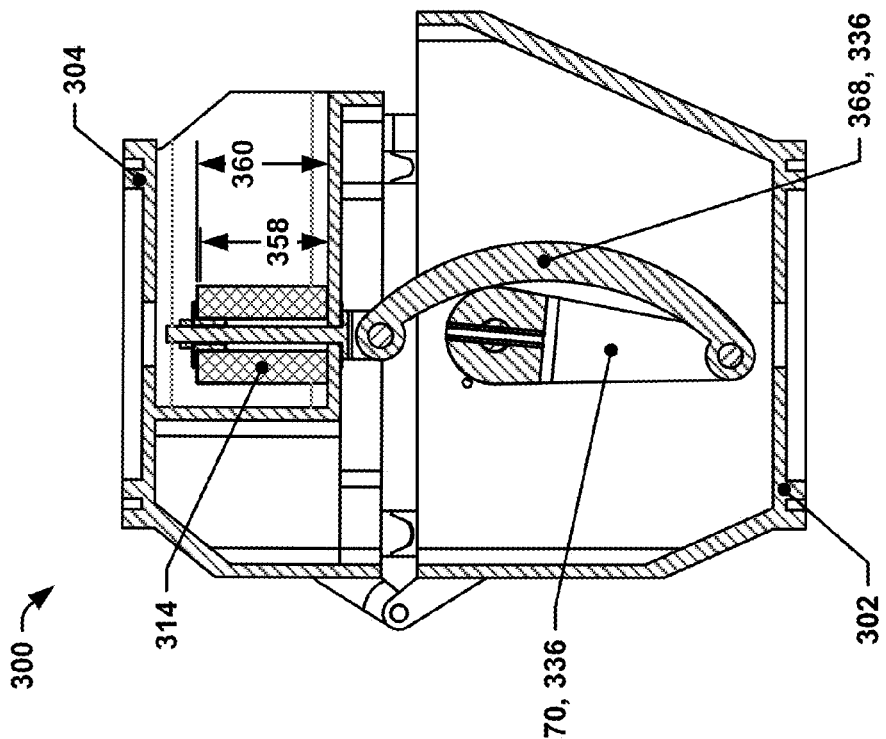
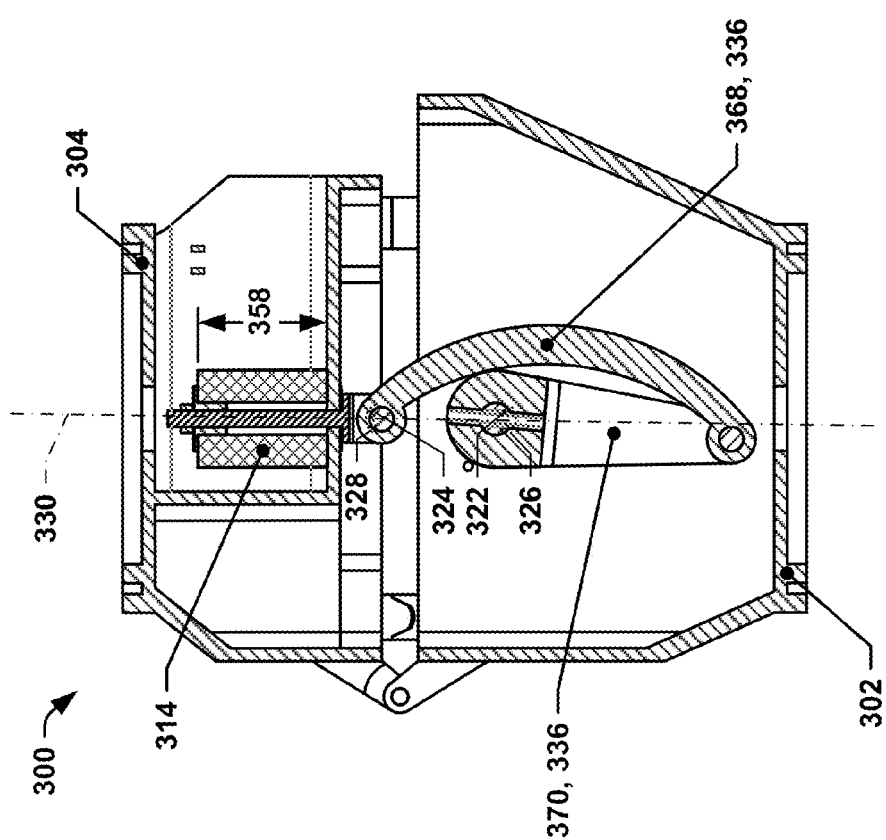

SHAPE MEMORY ALLOY PRE-LOADED DEPLOYMENT HINGE

TECHNICAL FIELD

This invention relates generally to locking hinges that are equipped with shape memory alloy pre-loading features. More specifically, this disclosure relates to locking hinges that may be used on spacecraft to allow antenna booms or other deployable structures to be coupled to the spacecraft main body via a hinged connection that, after deployment, may be locked and pre-loaded to prevent or reduce compliance in the hinge interface.

BACKGROUND OF THE INVENTION

The assignee of the present invention manufactures and deploys spacecraft for, inter alia, communications and broadcast services. Spacecraft often include various deployable structures, e.g., solar arrays, antenna reflectors, antenna masts, etc. Such structures may, for example, often be folded flat against a side of the spacecraft during launch and may then subsequently be deployed using, for example, hinged connections when the spacecraft is on-orbit.

Because of the large distances involved, small misalignments in such a hinge may have significant repercussions in overall system performance. For example, a 0.1 degree misalignment in an antenna reflector for a satellite at an altitude of 37,000 km may cause the resulting terrestrial antenna illumination area to shift by nearly 65 km.

There is thus a need for hinged interfaces for use in satellites that have anti-compliance capabilities when in the hinge-closed state.

SUMMARY OF INVENTION

The systems, methods and devices of the disclosure each have several innovative aspects, no single one of which is solely responsible for the desirable attributes disclosed herein. One innovative aspect of the subject matter described in this disclosure can be implemented in a variety of ways.

The present inventor has appreciated that a latching hinge that includes a shape-memory alloy (SMA) pre-load device configured to induce a pre-load across a contact interface of the latching hinge in a direction substantially perpendicular to the hinge pivot axis when the latching hinge is in a closed condition may be used to provide a low-compliance deployment hinge for use in spacecraft or other systems. While the inventor has presented two separate variants of such locking hinges herein, the general concept of using an SMA pre-load device in such a manner may be applied to a variety of other latching hinge designs and are considered to be within the scope of this disclosure.

In some implementations, a latching hinge may be provided. The latching hinge may include a first member, a second member rotatably coupled to the first member about a hinge, and a shape-memory alloy preload device. The first member and the second member may be rotatably coupled such that, in a hinge-closed condition, a first interface surface of the first member is restrained substantially parallel and proximate to a second interface surface of the second member by a latch mechanism, and, in a hinge-open condition, the first interface surface is at a substantial angle to the second interface surface. The SMA pre-load device may be configured to transition from a first phase to a second phase when heated to a transformation temperature. When the SMA pre-load device is transitioned from the first phase to the second phase while the latching hinge is in the hinge-closed condition, expansion of the SMA pre-load device may load the latch mechanism so as to press one or more first contact areas on the first interface surface into substantially gapless contact with one or more corresponding second contact areas on the second interface surface.

In some implementations, the SMA pre-load device may be further configured such that expansion of the SMA pre-load device when the latching hinge is in the hinge-closed condition loads the latch mechanism primarily along an axis substantially perpendicular to a hinge axis of the hinge.

In some implementations, the SMA pre-load device may have a first length in the first phase and may expand to a second length in the second phase, and the SMA pre-load device may be positioned such that the expansion of the SMA pre-load device induces a pre-load in the latch mechanism without plastic deformation of the latch mechanism.

In some implementations, the SMA pre-load device may use a one-way SMA. In some implementations, the SMA pre-load device may include a thick-wall tube of SMA and an electrical heating element configured to heat the SMA to the transformation temperature.

In some implementations, the first member may include a first pre-load application area substantially centered with respect to the one or more first contact areas, and the second member may include a second pre-load application area substantially centered with respect to the one or more second contact areas. The first pre-load application area and the second pre-load application area may be spaced apart by a first distance when the latching hinge is in the hinge-closed condition. The latch mechanism may include a third pre-load application area, a fourth pre-load application area, and one or more latching members joining the third pre-load application area and the fourth pre-load application area. When the latching hinge is in the hinge-closed condition, the third pre-load application area and the fourth pre-load application area may be spaced apart by a second distance larger than the first distance when the SMA pre-load device is in the first phase, the latch mechanism and SMA pre-load device may be positioned such that the first pre-load application area, the second pre-load application area, the third pre-load application area, the fourth pre-load application area, and the SMA pre-load device may all be substantially centered on a common pre-load axis, the first pre-load application area may face the third pre-load application area, and the second pre-load application area may face the fourth pre-load application area. The SMA pre-load device, when transitioned from the first phase to the second phase, may increase in length along the common pre-load axis by an amount greater than any inter-component compliance in a direction parallel to the common pre-load axis and between the first pre-load application area and the third pre-load application area added to any inter-component compliance in the direction parallel to the common pre-load axis and between the second pre-load application area and the fourth pre-load application area.

In some implementations, the first pre-load application area may face away from the first interface surface, the second pre-load application area may face away from the second interface surface, the third pre-load application area and the fourth pre-load application area may face each other, and the latch mechanism may be configured to allow the third pre-load application area to swing clear of the first pre-load application area while the latching hinge is transitioned between the hinge-open condition and the hinge-closed condition In some implementations, the latch mechanism may have a latching member and the latching member, the third pre-load application area, and the fourth pre-load application area may form a C-shape with the third pre-load application area and the fourth pre-load application area located along horizontal portions of the C and the one or more latching members provided by a vertical portion of the C. The latch mechanism may be rotatably connected with the second member.

In some further implementations, the latch mechanism may include a flexible beam spring. The latch mechanism may be connected at an end near the fourth pre-load application area to the flexible beam spring and the flexible beam spring may be connected to the second member. The flexible beam spring may be configured to allow the latch mechanism to rotate into an unlatched position when the flexible beam spring is in an elastically unstable state and to cause the latch mechanism member to rotate into a latched position when the flexible beam spring relaxes into an elastically stable state.

In some implementations, the latching hinge may also include an eccentric. The eccentric may be positioned, when the latching hinge is in the hinge-closed condition, in a location intersecting the common pre-load axis and selected from the group consisting of a location between the first pre-load application area and the third pre-load application area and a location between the second pre-load application area and the fourth pre-load application area.

In some implementations, the SMA preload device, when the latching hinge is in the hinge-closed condition, may be positioned in a location selected from the group consisting of a location between the first pre-load application area and the third pre-load application area and a location between the second pre-load application area and the fourth pre-load application area.

In some implementations, the one or more first contact areas may include at least three substantially symmetric first pairs of opposing, slanted surfaces and the one or more second contact areas may include at least three substantially symmetric second pairs of opposing, slanted surfaces. Each of the substantially symmetric first pairs of opposing, slanted surfaces may have a first axis of symmetry, and each of the substantially symmetric second pairs of opposing, slanted surfaces may have a second axis of symmetry. The first axes of symmetry for the at least three substantially symmetric first pairs of opposing, slanted surfaces may intersect at a first substantially common location, and the second axes of symmetry for the at least three substantially symmetric second pairs of opposing, slanted surfaces may intersect at a second substantially common location. In some implementations, at least two of the first axes of symmetry may be orthogonal to one another.

In some implementations, the one or more first contact areas may include at least four substantially symmetric first pairs of opposing, slanted surfaces. The fourth substantially symmetric first pair of opposing, slanted surfaces also may have a first axis of symmetry, and the first axes of symmetry for the at least four substantially symmetric first pairs of opposing, slanted surfaces may intersect at the fourth substantially symmetric first pair of opposing, slanted surfaces. The one or more second contact areas may also include at least four substantially symmetric second pairs of opposing, slanted surfaces, and the fourth substantially symmetric second pair of opposing, slanted surfaces may also have a second axis of symmetry. The second axes of symmetry for the at least four substantially symmetric second pairs of opposing, slanted surfaces may intersect at the fourth substantially symmetric second pair of opposing, slanted surfaces.

In some implementations, the latching hinge may also include a torsion spring drive mechanism substantially centered on a pivot axis of the hinge. The torsion spring drive mechanism may be configured to urge the first member and the second member to rotate about the pivot axis such that the first interface surface and the second interface surface come into contact.

In some implementations, the one or more latching members may include a driven link and a drive link arranged to form a linkage. The drive link may be configured to pivot about a first linkage axis that is fixed with respect to the first member, and the driven link may be configured to pivot about a second linkage axis that is substantially fixed with respect to the second member. The driven link and the drive link may be rotatably connected to one another about a third linkage axis, and the linkage may be configured such that rotation of the drive link about the first linkage axis when the locking hinge is in the hinge-open condition causes the drive link to rotate into the first member, draw the driven link into the first member, and draw the first member and the second member towards each other such that the locking hinge transitions from the hinge-open condition to the hinge-closed condition.

In some implementations, the linkage may be configured so that a portion of the driven link contacts an end of the drive link near the first linkage axis when the latching hinge is in the closed hinge condition and the SMA pre-load device is in the second phase.

In some implementations, the linkage may be configured so that when the latching hinge is transitioned from the hinge-open condition to the hinge-closed condition, the third linkage axis passes through and past bottom dead center with respect to an axis passing through the first linkage axis and the second linkage axis.

In some implementations, the latch mechanism may be configured to restrain the first member and the second member from rotating relative to each other after the first interface surface and the second interface surface come into contact by applying a motion constraint along an axis substantially centered on the first interface surface and the second interface surface.

In some implementations, a spacecraft may be provided. The spacecraft may include a main body, a boom, and a latching hinge as described herein. The boom may be coupled to the main body by the latching hinge and the spacecraft may be configured to transition from a stowed state to a deployed state by releasing the boom from the stowed state, rotating the boom so as to close the latching hinge, engaging the latching mechanism, and pre-loading the latching mechanism by transitioning the SMA pre-load device from the first phase to the second phase.

Details of one or more implementations of the subject matter described in this specification are set forth in the accompanying drawings and the description below. Other features, aspects, and advantages will become apparent from the description, the drawings, and the claims. Note that the relative dimensions of the following figures, unless otherwise noted, may not be drawn to scale.

BRIEF DESCRIPTION OF THE DRAWINGS

FIG. 2K depicts a side section view of the example latching hinge of FIG. 2A in the hinge-closed condition with no preload.

FIG. 2L depicts a side section view of the example latching hinge of FIG. 2A in the hinge-closed condition with pre-load.

FIG. 3N depicts a side section view of the example latching hinge of FIG. 3A in the hinge-closed condition with the SMA actuator in the unexpanded state.

FIG. 3O depicts a side section view of the example latching hinge of FIG. 3A in the hinge-closed condition with the SMA actuator in the expanded state.

FIGS. 2A through 3M are drawn to scale within each Figure, although the Figures may vary in scale from Figure to Figure.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to or with another element, it can be directly connected or coupled to or with the other element, or intervening elements may be present. Furthermore, "connected" or "coupled" as used herein in an electrical context may include wirelessly connected or coupled. As used herein, the term "and/or" includes any and all combinations of one or more of the associated listed items. The symbol "/" is also used as a shorthand notation for "and/or."

Figure 1A:
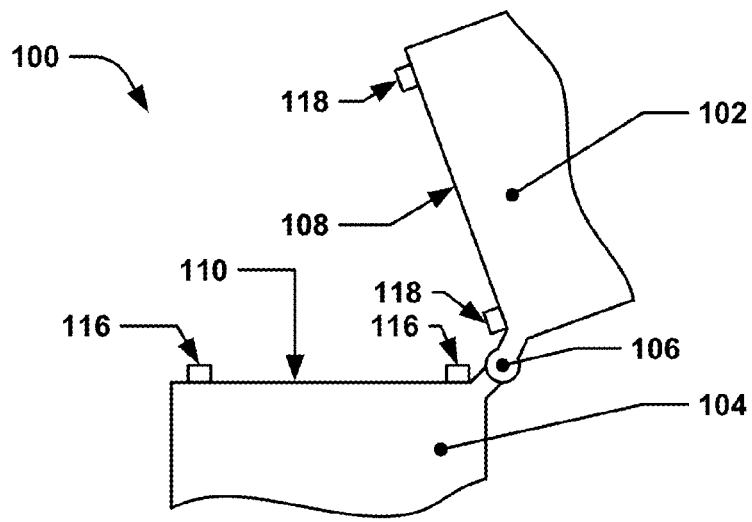
FIG. 1A depicts a side view of a high-level example of a latching hinge in an open condition.

FIG. 1A depicts a side view of a high-level example of a latching hinge in an open condition. As can be seen, a latching hinge 100 is shown that includes a first member 102 and a second member 104. The first member 102 and the second member 104 are rotatably connected via a hinge 106 that is located along one side of the first member 102 and the second member 104. The first member 102 may have a first interface surface 108, and the second member 104 may have a second interface surface 110. The first interface surface 108 and the second interface surface 110 may rotate away from each other when the latching hinge 100 is opened from a closed position, and may rotate towards one another when the latching hinge 100 is closed from an open position. The first interface surface 108 may have one or more first contact areas 116 that may contact corresponding second contact areas 118 on the second interface surface 110 when the latching hinge 100 is fully closed. In some implementations, the first contact area 116 may be coextensive with the first interface surface, i.e., the entire first interface surface 108 (or at least a significant portion of it) may contact the entire second interface surface 110 (or at least a significant portion of it). In other implementations, the first contact areas 116 and the second contact areas 118 may be provided via features (or components) that protrude from the first interface surface 108 and the second interface surface 110, respectively.

Figure 1B:
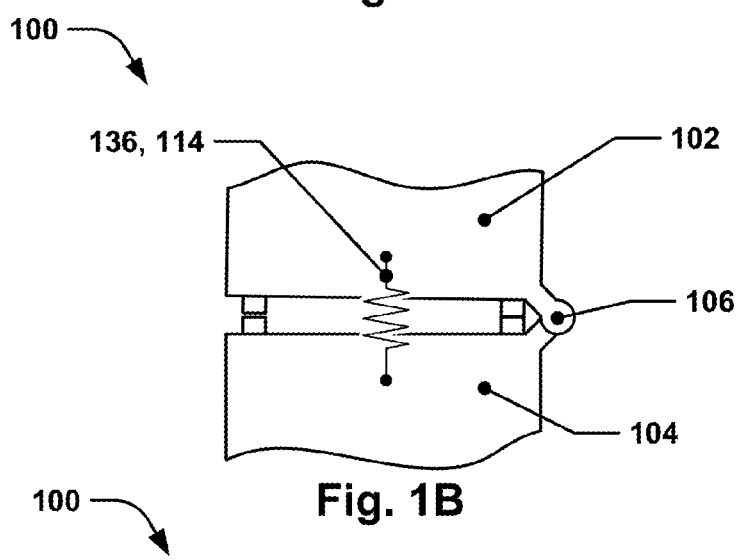
FIG. 1B depicts a side view of the example latching hinge of FIG. 1A in a closed and non-preloaded condition.

FIG. 1B depicts a side view of the example latching hinge of FIG. 1A in a closed and non-preloaded condition. As can be seen, the latching hinge 100 has closed, although a slight gap is visible between the first contact area 116 and the second contact area 118 on the side opposite the hinge 106. Such a gap may arise due to slight misalignments in components of the latching hinge or due to compliance in the inter-component interfaces. Also visible in FIG. 1B is a representative discrete spring feature that may represent one or more latching members 136 and an SMA preload device 114. The one or more latching members 136 and SMA preload device 114 may provide a latch mechanism that prevents the latching hinge 100 from opening once it has closed.

Figure 1C:
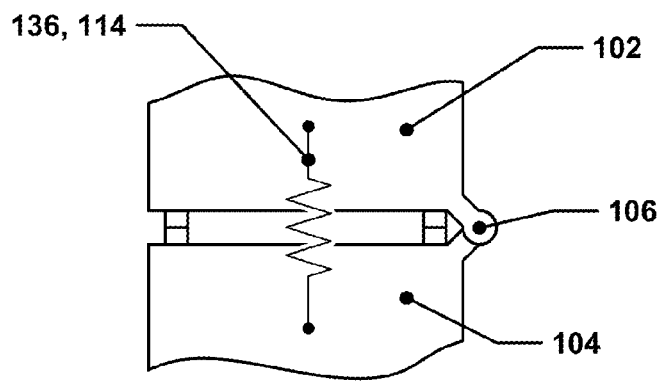
FIG. 1C depicts a side view of the example latching hinge of FIG. 1A in a closed and preloaded condition.

FIG. 1C depicts a side view of the example latching hinge of FIG. 1A in a closed and preloaded condition. As can be seen, the gap that existed between the first contact area 116 and the second contact area 118 on the side opposite the hinge 106 has been closed due to a preload induced in the load path provided by the one or more latching members 136 and the SMA preload device 114. The preload may be induced by expansion of the SMA preload device 114, which may cause the SMA preload device 114 to undergo compressive loading and the one or more latching members 136 to undergo tensile loading or compressive and tensile loading in a manner that causes a compressive preload across the first contact areas 116 and the second contact areas 118. Two examples of such latching hinges are discussed below with reference to additional figures.

Figure 2A:
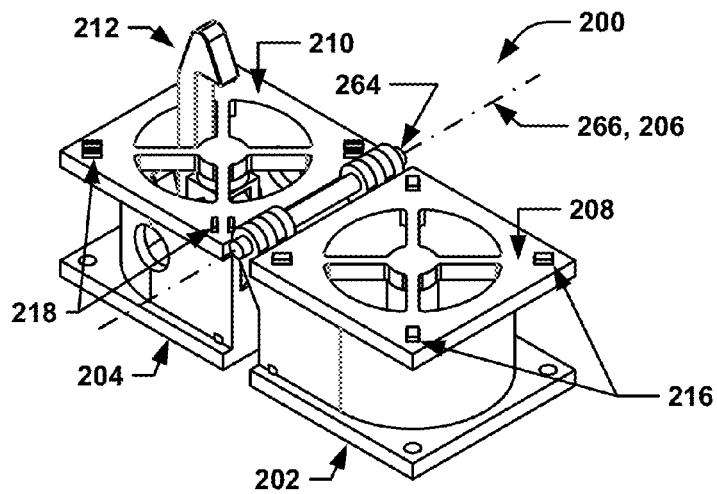
FIG. 2A depicts an isometric view of one example of a latching hinge in a hinge-open condition.

FIG. 2A depicts an isometric view of one example of a latching hinge in a hinge-open condition. A latching hinge 200 is shown that includes a first member 202 and a second member 204. The first member 202 and the second member 204 may be joined together by a hinge 206, which may be configured to allow the first member 202 and the second member 204 to pivot with respect to one another about a pivot axis 266. A pin 264 may, for example, provide the pivot axis 266. The first member 202 and the second member 204 may include one or more mounting features (not illustrated) that may be configured to join the first member 202 and the second member 204 to mating structures, e.g., a satellite deployment boom, a spacecraft, or other structures.

The first member 202 may include a first interface surface 208 and the second member 204 may include a second interface surface 210. The first interface surface 208 and the second interface surface 210 may, as shown, be generally planar in nature and may be proximate to and facing one another when the first member 202 and the second member 204 are in a hinge-closed condition. However, the first interface surface 208 and the second interface surface 210 may also be non-planar surfaces, or surfaces with planar and non-planar elements. The first interface surface 208 may support a number of first contact areas 216. Similarly, the second interface surface 210 may support a corresponding number of second contact areas 218.

A latch mechanism 212 may also be included in latching hinge 200. The latch mechanism 212 may, as in this case, be a sprung latch configured to restrain the first member 202 and the second member 204 with respect to one another when latched.

When in the hinge-closed condition, the first member 202 and the second member 204 may contact one another via the contact areas, preventing further rotational movement. The contact areas may be provided by separate components affixed to the interface surfaces, or may simply be areas of the interface surfaces or provided by features in the interface surfaces (as shown). In some implementations, each first contact area 216 may include a first pair of opposing slanted surfaces. The slanted surfaces of each of the first contact areas 216 may be symmetric about a first axis of symmetry 252, as illustrated in FIG. 2E. Similarly, each second contact area 218 may include a second pair of opposing slanted surfaces. The slanted surfaces of each of the second contact areas 218 may be symmetric about a second axis of symmetry 256 (FIG. 2E).

When the first member 202 and the second member 204 are in the hinge-closed condition, the slanted surfaces of the first contact areas 216 may engage with the slanted surfaces of the second contact areas 218 so that each such engagement forms a sliding contact between the pairs of opposing slanted surfaces that allows for sliding motion along the respective axis of symmetry. Due to the sloped nature of the slanted surfaces, relative positional compliance between the first member 202 and the second member 204 may be largely eliminated when the latching hinge is in the closed condition.

Figure 2B:
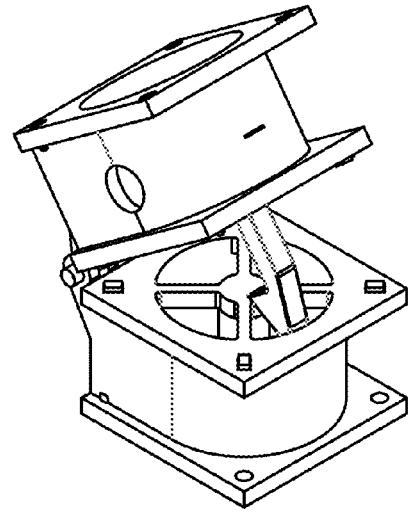
FIG. 2B depicts an isometric view of the example latching hinge of FIG. 2A in a semi-hinge-closed condition.

FIG. 2B depicts an isometric view of the example latching hinge of FIG. 2A in a semi-hinge-closed condition. As can be seen, the second member 204 has been rotated about the pin 264 by approximately 135 degrees—far enough that the latch mechanism 212 has contacted a center portion 223 (see FIG. 2E) of the first member 202, which is supported within the center of the first member 202 by four support beams 225 (see FIG. 2E). Other geometries are possible as well—the depicted example is simply provided to show one possible variant.

The relative movement between the first member 202 and the second member 204 may be driven, for example, by a spring drive, e.g., a torsion spring (not shown) wound around the pin 264. Other drive mechanisms may be suitable as well, such as a motor drive, linear actuator with a linkage, etc. A damper (not shown) may be used to moderate the speed of rotation if needed.

Figure 2C:
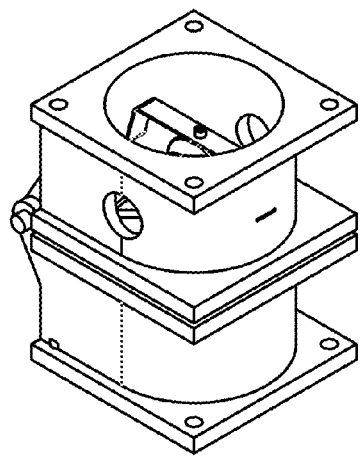
FIG. 2C depicts an isometric view of the example latching hinge of FIG. 2A in a hinge-closed condition.

FIG. 2C depicts an isometric view of the example latching hinge of FIG. 2A in a hinge-closed condition. As can be seen, a slight gap exists between the first interface surface 208 and the second interface surface 210, although the first member 202 and the second member 204 may be in contact with one another via the first contact areas 216 and the second contact areas 218.

Figure 2D:
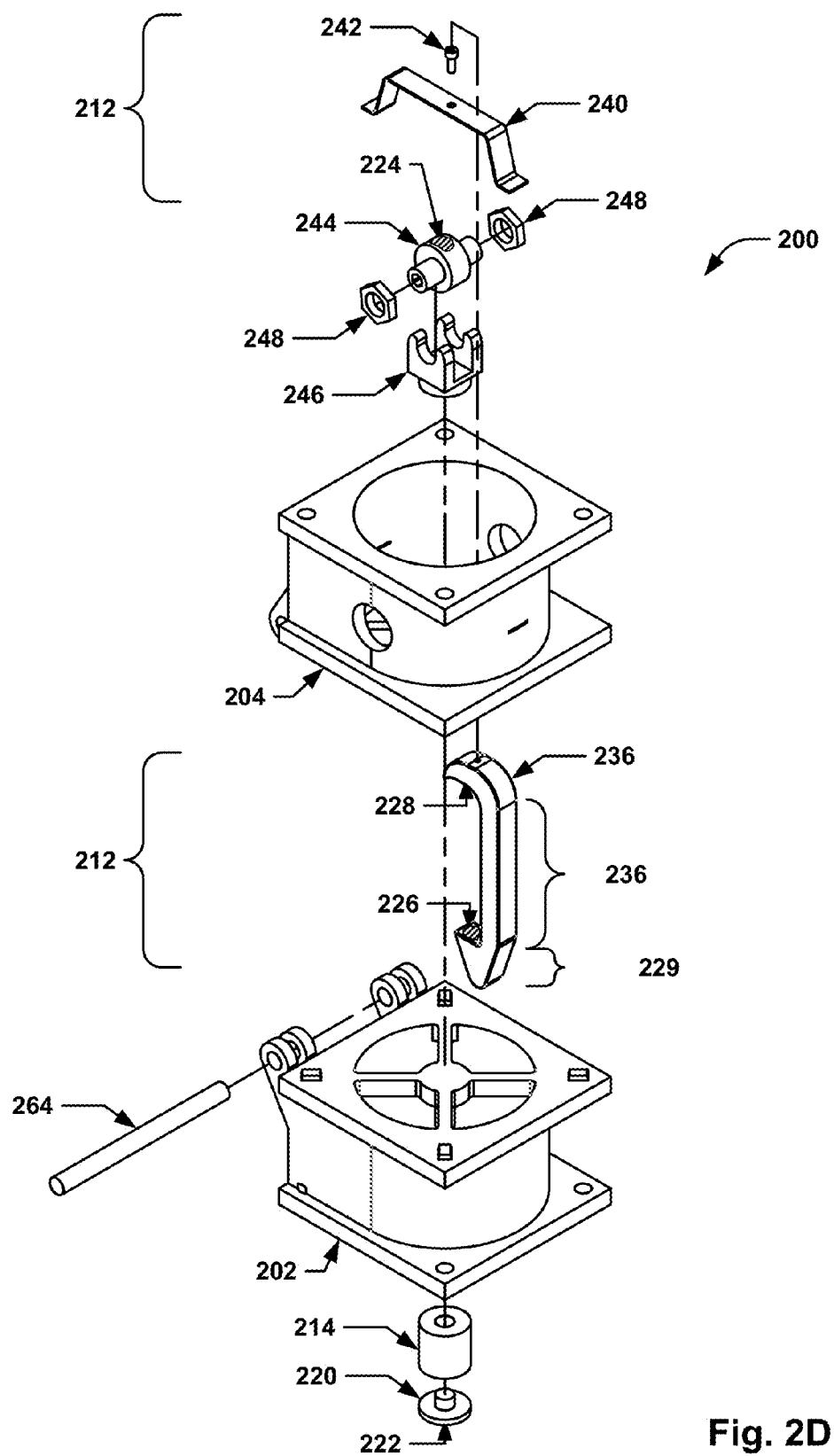
FIG. 2D depicts an isometric exploded view of the example latching hinge of FIG. 2A.
Figure 2E:
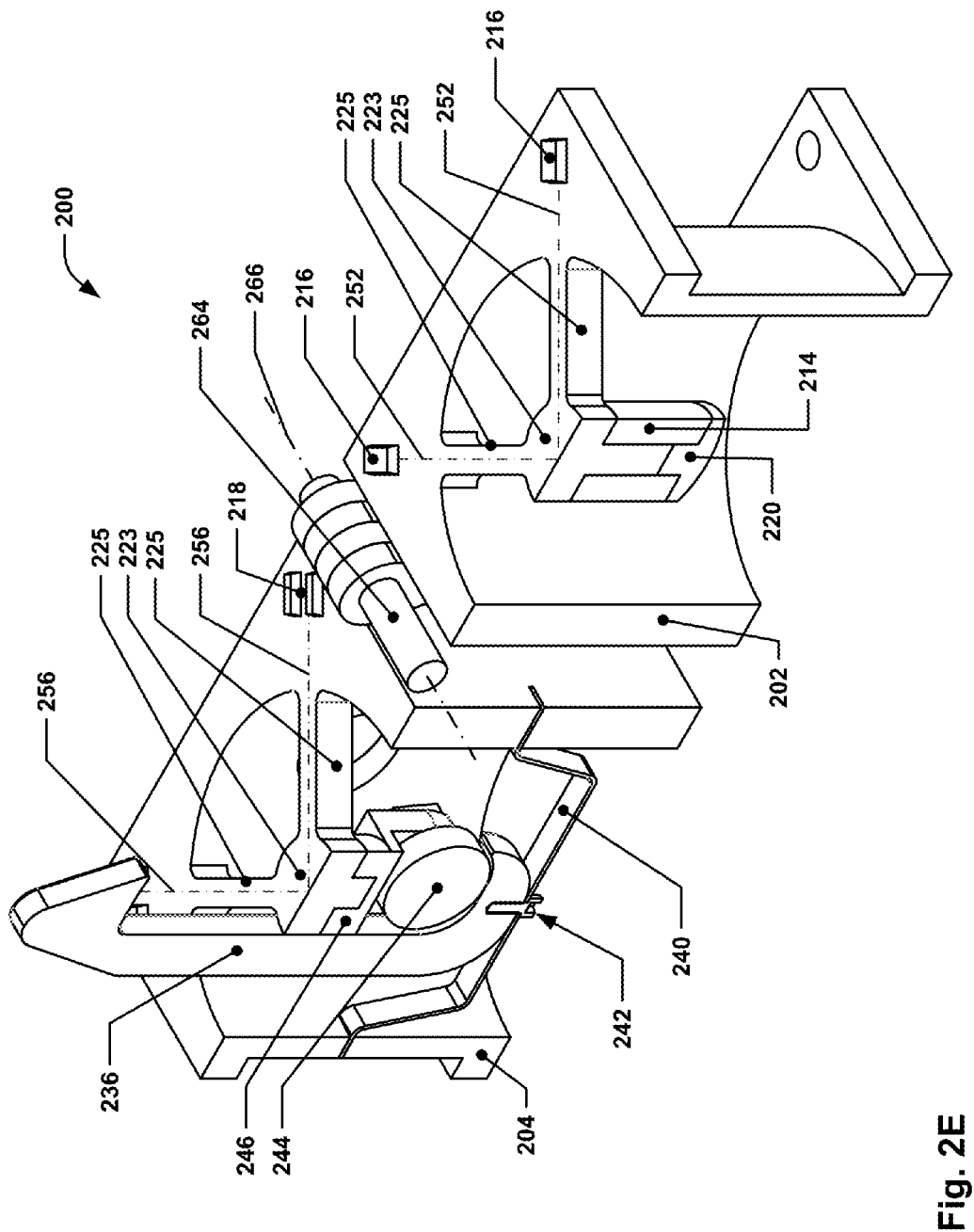
FIG. 2E depicts an isometric section view of the example latching hinge of FIG. 2A in the hinge-open condition.

FIG. 2D depicts an isometric exploded view of the example latching hinge of FIG. 2A. The latching hinge 200 may include, as noted above, the first member 202 and the second member 204. The latching hinge 200 may also include a number of components that form a latch mechanism 212 (shown divided amongst two separate areas of FIG. 2D). Rotational movement of the first member 202 with respect to the second member 204 may be enabled by the pin 264.

The latching hinge 200 may also include a shape-memory alloy (SMA) pre-load device 214, shown in the Figures as being located within the first member 202, and an SMA pre-load adapter 220 that may be configured to be supported by the SMA pre-load device and serve as a first pre-load application area 222. In other implementations, however, a separate SMA pre-load adapter may not be necessary, i.e., the first pre-load application area 222 may be located directly on the SMA pre-load device 214.

Also visible in FIG. 2D are an eccentric 244 and an eccentric adapter 246. Jam nuts 248 may be used to lock the eccentric 244 into a desired eccentricity setting with respect to the eccentric adapter 246. The eccentric 244 may provide a second pre-load application area 224.

The latch mechanism 212 may include a latching member 236 that joins a third pre-load application area 226 and a fourth pre-load application area 228. Such an arrangement may, as shown, form a component shaped somewhat like the letter "C," where the latching member 236 may form the substantially vertical portion of the C and the substantially horizontal portions of the C may provide the third pre-load application area 226 and the fourth pre-load application area 228. The latch mechanism 212 may, in some implementations, include a tapered tip 229 that may prevent binding in the latching hinge 200 during transitioning from the hinge-open condition to the hinge-closed condition. The latch mechanism 212 may also include, for example, a beam spring 240 and a screw 242. The latching member 236 may be joined to the beam spring 240 by the screw 242. The beam spring 240 may allow the latching member 236 to rotate and deflect by small amounts sufficient to allow the latching member 236 to, for example, accommodate adjustment of the eccentric 244 or to rotate out of the way of the first member 202 when the latching hinge 200 is transitioned from the hinge-open condition to the hinge-closed condition.

FIG. 2E depicts an isometric section view of the example latching hinge of FIG. 2A in the hinge-open condition. The beam spring 240 may flexibly support the latching member 236, and the latching member 236 may be connected to the beam spring 240 by screw 242. The beam spring 240 may be positioned so as to press the fourth pre-load application area into contact with the second pre-load application area 224 with some amount of force regardless of how the eccentric 244 is oriented.

Also visible in FIG. 2E, among other components, are two first contact areas 216 and two second contact areas 218 (although one of these is nearly completely obscured by the latching member 236). Two first axes of symmetry 252 are shown, as are two second axes of symmetry 254. As can be seen, the first axes of symmetry 252 mirror the second axes of symmetry 254 about the pivot axis 266. Additionally, the first axes of symmetry 252 (including those not shown) all intersect at a common point, e.g., at the center of the first member 202. Similarly, the second axes of symmetry 254 (also including those not shown) all intersect at a common point, e.g., at the center of the second member 204. While such intersections are not necessary, such an arrangement allows for the first contact areas 216 and the second contact areas 218 to cause the first member 202 and the second member 204 to center themselves with respect to each other without binding.

With respect to the second member 204, the SMA pre-load device 214 and the SMA pre-load adapter 220 can be seen. The SMA pre-load device 214 is shown as a thick wall tube, although other solid cylinder or other shape SMA pre-load device 214 may be used as well. SMAs are special metal alloys that can be formed or trained into a particular shape, i.e., a "parent shape," that is "remembered" by the SMA and that the SMA will revert back to when heated to a "transition temperature." Training an SMA to have a particular shape may involve heating the SMA to a temperature substantially in excess of the transition temperature. For example, some SMAs may be heated to a temperature of approximately 500 degrees Celsius for 10-25 minutes while restrained in a fixture that holds the SMA in a desired shape to train the SMA to remember that shape as the parent shape. After training, the SMA may be plastically deformed into other shapes at room temperature. Heating the SMA up to, for example, 50 to 70 degrees Celsius may then cause the plastically-deformed SMA to return to the parent shape.

In the case of the SMA pre-load device 214, the thick-wall tube that forms the bulk of the SMA pre-load device 214 may be trained into a parent shape of a tube that is 2" long. The SMA pre-load device 214 may then be plastically deformed by axially compressing the tube, thereby shortening the SMA pre-load device 214 by some amount, e.g., 0.050". Upon being heated to the transition temperature, the SMA pre-load device 214 may revert to the parent shape and increase in length.

A heater coil (not shown), e.g., resistive heater wrap, may be placed around the SMA pre-load device 214 to provide heat to the SMA pre-load device 214 to provide the heat needed to raise the SMA pre-load device 214 to the transition temperature. The SMA pre-load device 214 may also be partially insulated to allow sufficient heat to accumulate to raise the temperature sufficiently.

Figure 2F:
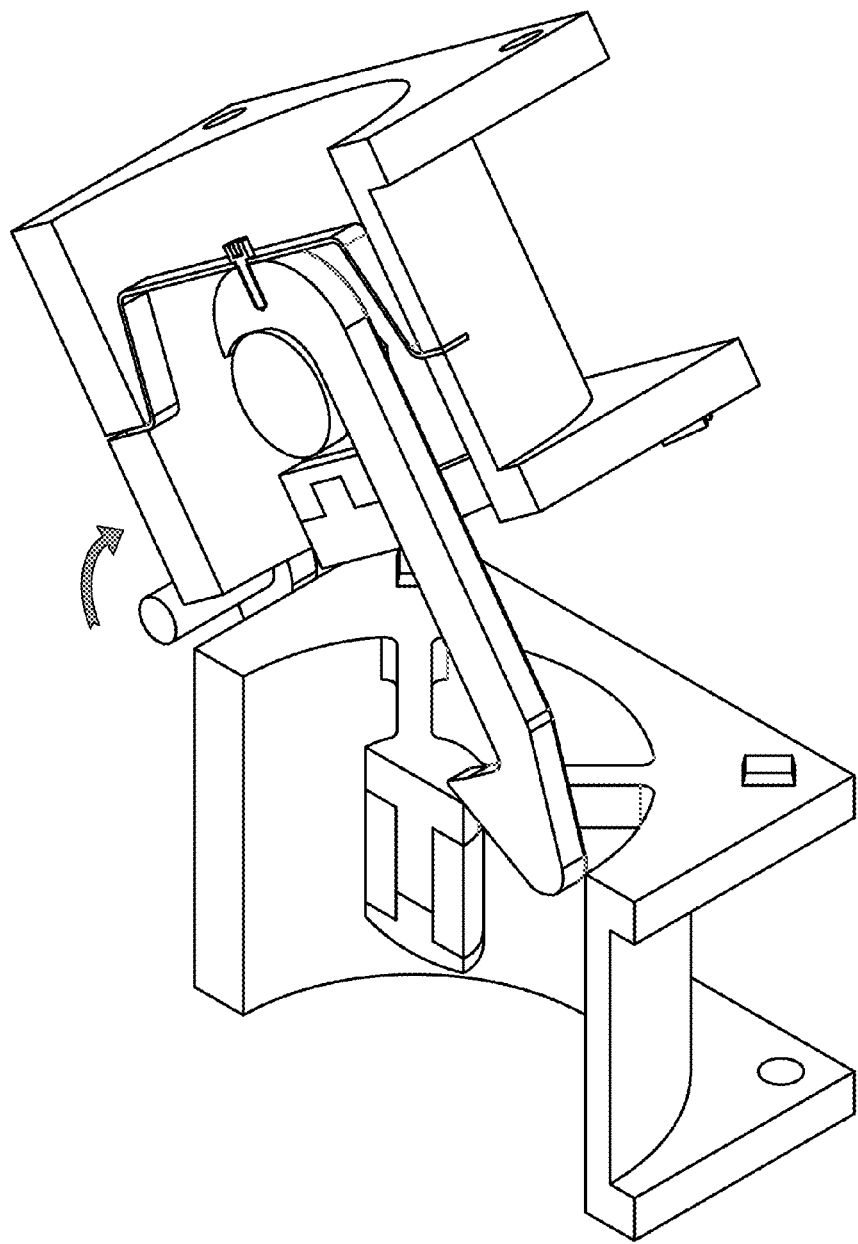
FIG. 2F depicts an isometric section view of the example latching hinge of FIG. 2A in a semi-hinge-closed condition.

FIG. 2F depicts an isometric section view of the example latching hinge of FIG. 2A in a semi-hinge-closed condition. As can be seen, the second member 204 has rotated far enough with respect to the first member 202 that protruding end of the latching member 236 has contacted the center portion of the first member 202.

Figure 2G:
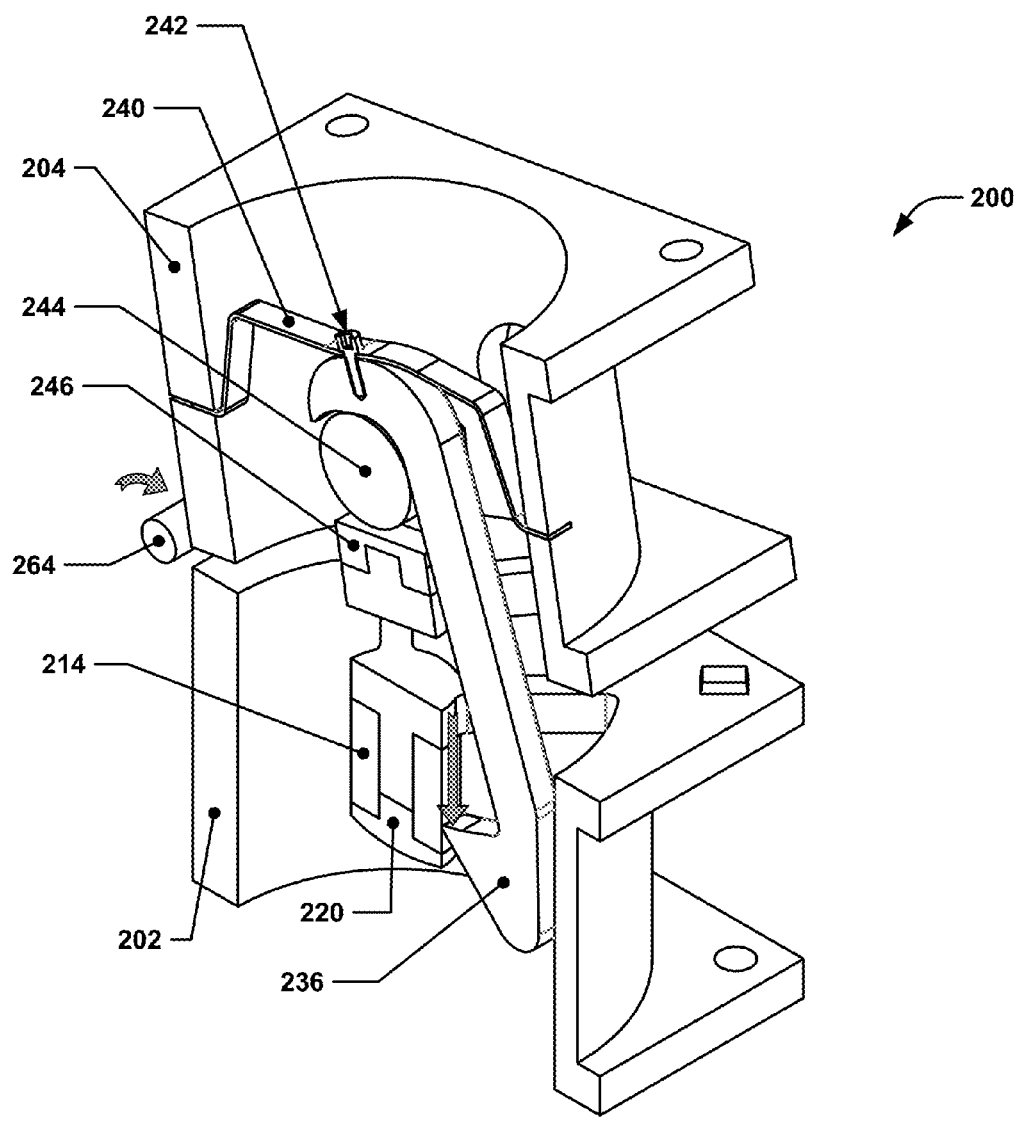
FIG. 2G depicts an isometric section view of the example latching hinge of FIG. 2A in a further semi-hinge-closed condition.

FIG. 2G depicts an isometric section view of the example latching hinge of FIG. 2A in a further semi-hinge-closed condition. At this stage of hinge closure, the latching member 236 has rotated slightly by flexing the beam spring 240 so as to allow the edge of the latching member 236 that is in contact with the first member 202 to slide along the first member 202 and other components, e.g., the SMA pre-load device 214 and the SMA pre-load adapter 220.

Figure 2H:
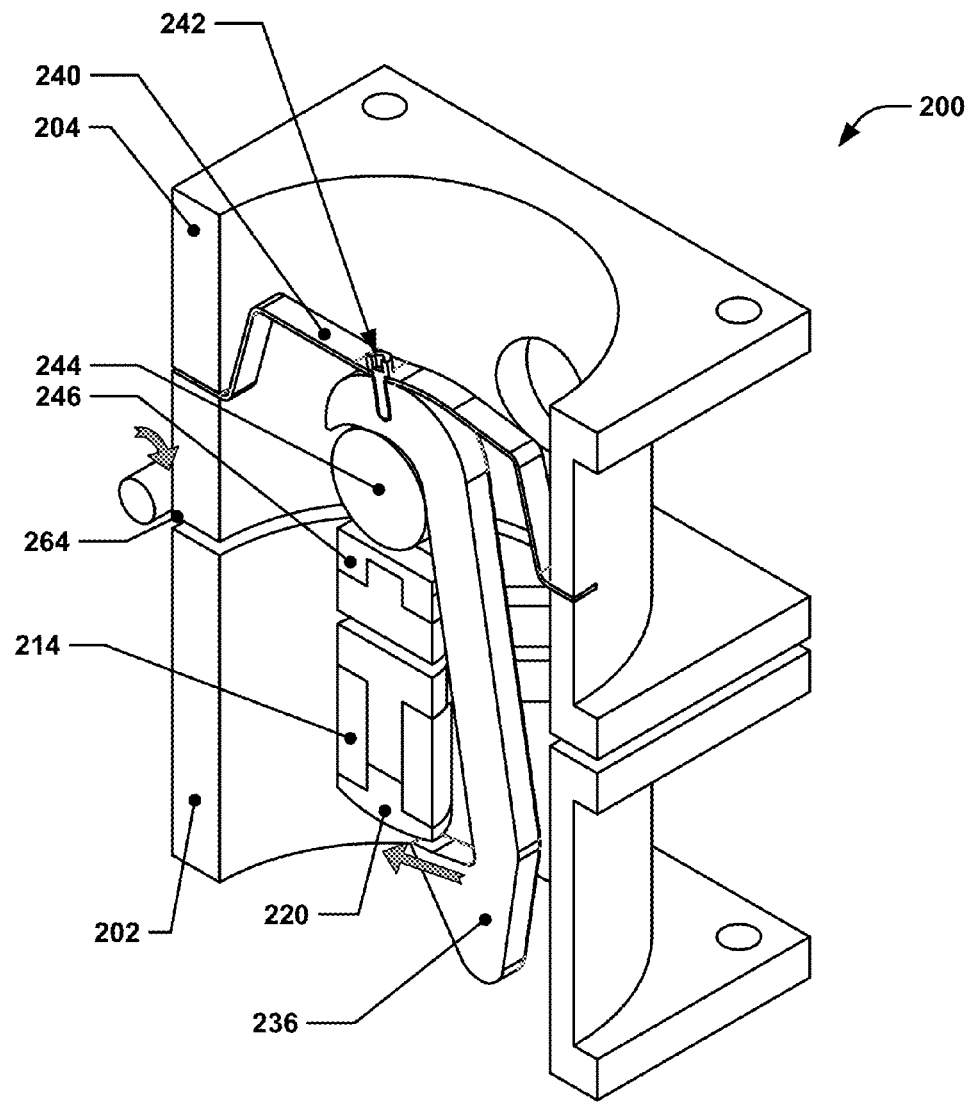
FIG. 2H depicts an isometric section view of the example latching hinge of FIG. 2A in the hinge-closed condition with a partially-latched latching mechanism.

FIG. 2H depicts an isometric section view of the example latching hinge of FIG. 2A in the hinge-closed condition with a partially-latched latching mechanism. In this view, the latching hinge 200 has closed but is not yet pre-loaded. The latching member 236 has cleared the end of the SMA pre-load device 214/SMA pre-load adapter 220 component stack and the beam spring 240 has started to return the latching member 236 to its elastically-stable position, i.e., the relative orientation of the latching member 236 to the second member 204 shown in FIG. 2E.

Figure 2I:
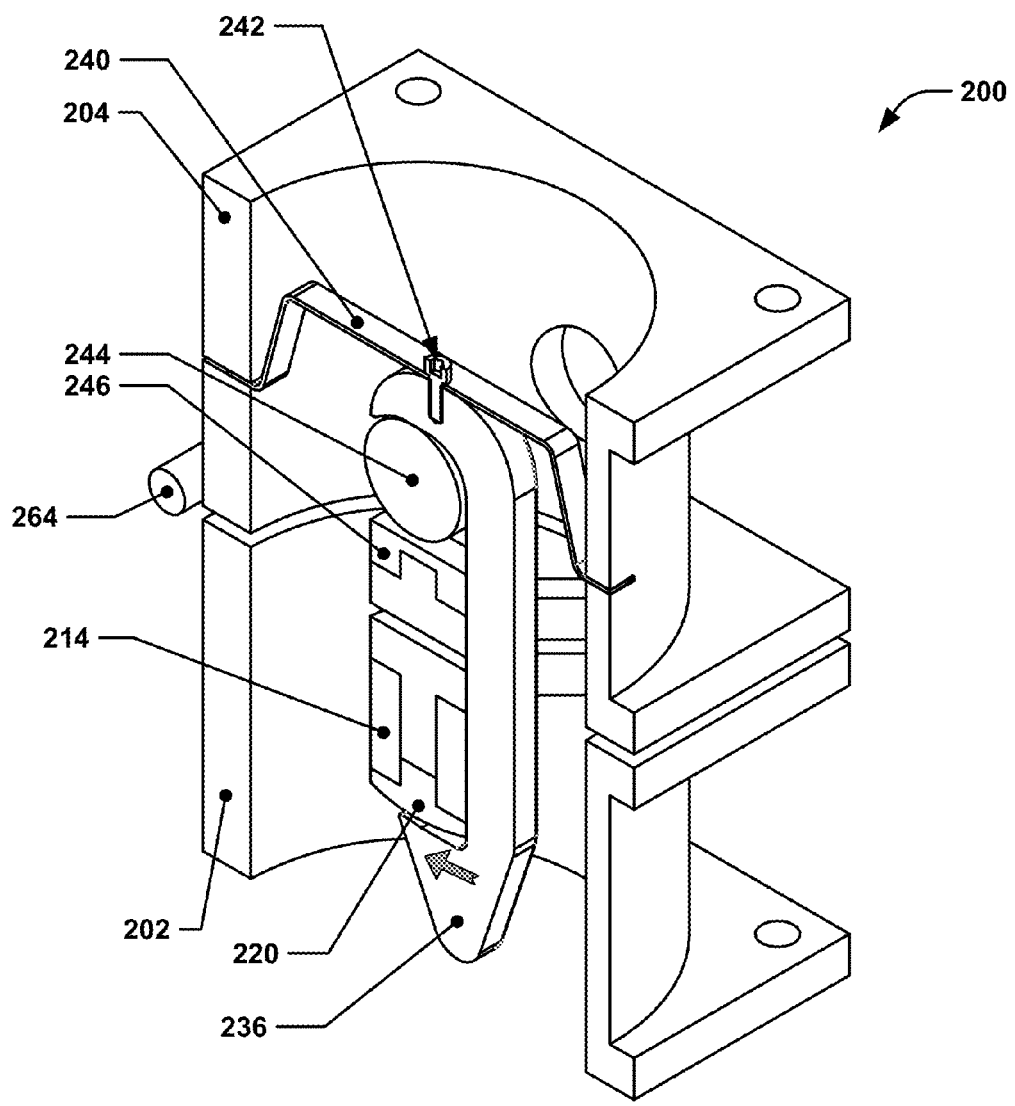
FIG. 2I depicts an isometric section view of the example latching hinge of FIG. 2A in the hinge-closed condition with a fully-latched latching mechanism.

FIG. 2I depicts an isometric section view of the example latching hinge of FIG. 2A in the hinge-closed condition with a fully-latched latching mechanism. As can be seen, the latching member 236 has "captured" the second member 204 with respect to the first member 202. If the latching hinge 200 attempts to re-open, the third pre-load application area 226 would engage with the first pre-load application area 222 after only a slight amount of hinge movement (movement that takes up the slight gap visible between the third pre-load application area 226 and the first pre-load application area 222) and would resist any further movement. Even this slight movement, however, may be unacceptable in satellite applications since such latching hinges may be used to mount antenna booms where even the slightest angular misalignments may result in communications failures.

Figure 2J:
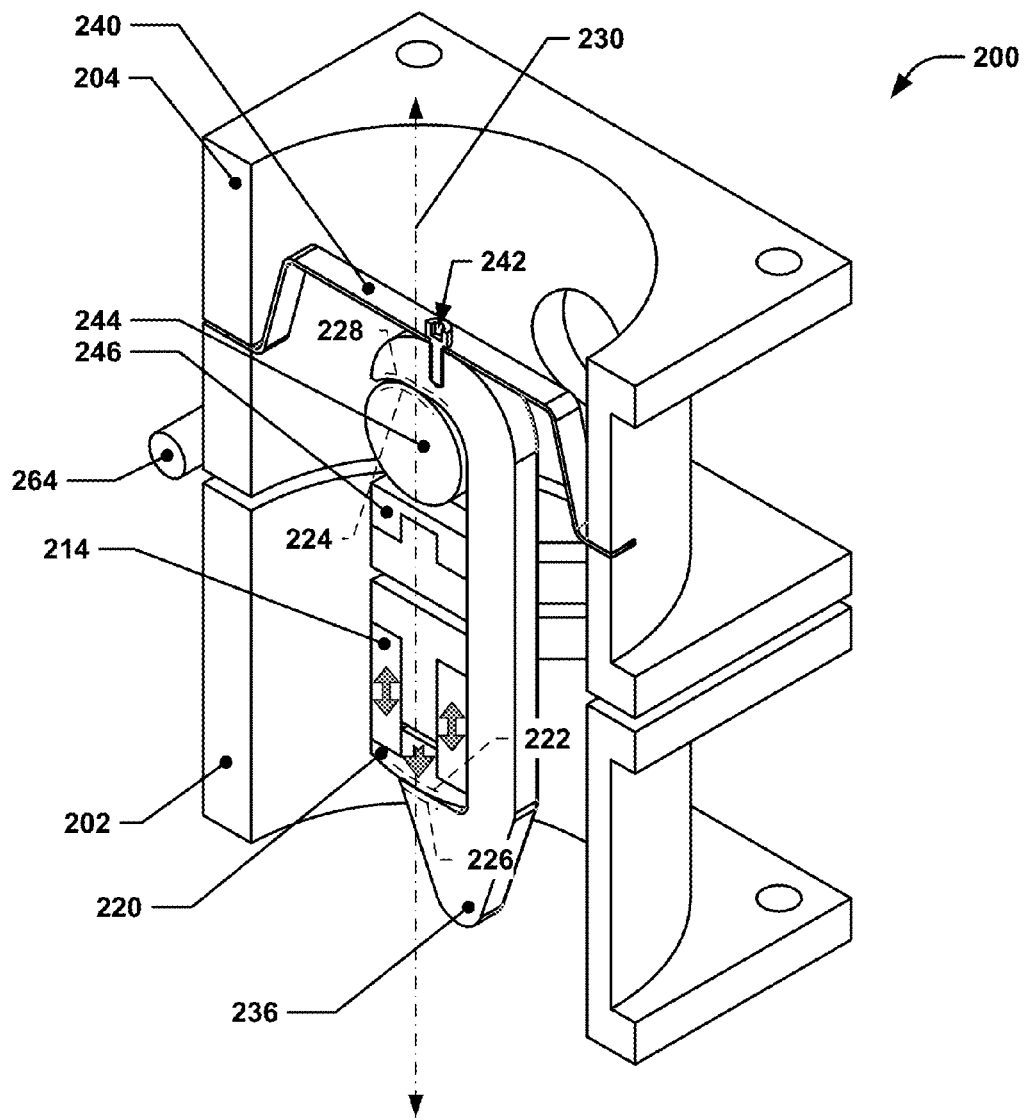
FIG. 2J depicts an isometric section view of the example latching hinge of FIG. 2A in the hinge-closed condition with a fully-latched latching mechanism and with an SMA preload actuator in an expanded state.

FIG. 2J depicts an isometric section view of the example latching hinge of FIG. 2A in the hinge-closed condition with a fully-latched latching mechanism and with an SMA pre-load actuator in an expanded state. In this view, the SMA pre-load device 214 has been actuated, i.e., heated to the transition temperature and reverted to a longer-length tube. This has cause the gap between the third pre-load application area 226 and the first pre-load application area 222 to be closed, and has induced a compressive load on the first member 202 and the second member 204 along a common pre-load axis 230 and a tensile load on the latching member 236. The common pre-load axis 230 may pass through, or near, the first pre-load application area 222, the second pre-load application area 224, the third pre-load application area 226, the fourth pre-load application area 228, and the SMA pre-load device 214 when the latching hinge 200 is in the hinge-closed condition. It is to be understood that the actual pre-load application areas will be at the bearing surfaces of the various contacting components in this implementation—to assist in viewing, the dashed lines indicating the pre-load application areas are somewhat offset from these contact surfaces.

The eccentric 244 may be used to fine-tune the amount of pre-load induced when the SMA pre-load-device 214 is actuated. For example, by rotating the eccentric 244, the gap between the third pre-load application area 226 and the first pre-load application area 222 in the hinge-closed condition and prior to SMA pre-load device 214 actuation may be increased or decreased (depending on the positioning of the eccentric 244). Correspondingly, this may decrease or increase the induced pre-load. The second member 204 may include features, e.g., transverse through-holes (as shown), to allow tool access to drive features on the eccentric 244, e.g., hex sockets, and the jam nuts 248.

FIG. 2K depicts a side section view of the example latching hinge of FIG. 2A in the hinge-closed condition with no pre-load. In this view, various distances between components or features are called out. For example, a first distance 232 between the first pre-load application area 222 and the second pre-load application area 224 is shown, as is a second distance 238 between the third pre-load application area 226 and fourth pre-load application area 228. Also indicated is first length 258, which represents the unactuated length of the SMA pre-load device 214.

FIG. 2K depicts a side section view of the example latching hinge of FIG. 2A in the hinge-closed condition with pre-load. As can be seen, the SMA pre-load device has been actuated and has expanded to second length 260, which is longer than first length 258. The first pre-load application area 222 and the third pre-load application area 2 26 are now in contact due to the expanded length of the SMA pre-load device 214, as are the second pre-load application area 224 and the fourth pre-load application area 228.

It is to be noted that there are two broad categories of SMAs currently available—"one-way" and "two-way" SMAs. One-way SMAs, once heated to the transition temperature, revert to their parent shapes and stay in that form once cooled (absent the application of any external stress sufficient to plastically deform them). Two-way SMAs revert to their parent shapes when heated to the transition temperature, but then return to the shape they were in prior to heating to the transition temperature after cooling. The SMA pre-load devices discussed herein utilize one-way SMAs. A two-way SMA pre-load device would be impractical since it would require the continuous application of power to maintain the SMA pre-load device at the transition temperature (thus maintaining the pre-load). A one-way SMA device, by contrast, only requires energy to be actuated, and does not require the continuous application of energy to maintain its actuated state.

It is also to be understood that while the exact magnitude of induced pre-load may fall within a considerable range of values, the pre-load induced will, for example, be sufficient to prevent compliance or wiggle of the structure incorporating the latching hinge under selected environmental conditions. It is to be further understood that "pre-load," as used herein, refers to loads greater than may be applied, for example, using a simple spring-loaded detent or other similar device.

It is to be understood that the components shown in the various views of FIGS. 2A through 2K may be arranged in different configurations from the configuration shown. For example, the eccentric 244 and eccentric adapter 246 may be swapped with the SMA pre-load device 214 and the SMA pre-load adapter 220 such that the beam spring 240 presses the fourth pre-load application area 228 of latching member 236 into contact with the SMA pre-load adapter 220. In such cases, the first pre-load application area 222 may be located on the eccentric 244, and the second pre-load application area 224 may be located on the SMA pre-load adapter 220. Generally speaking, the first pre-load application area 222 and the third pre-load application area 226 are used to refer to pre-load application areas associated with the first member 202, and the second pre-load application area 224 and the fourth pre-load application area 228 are used to refer to pre-load application areas associated with the second member 204.

Figure 3C:
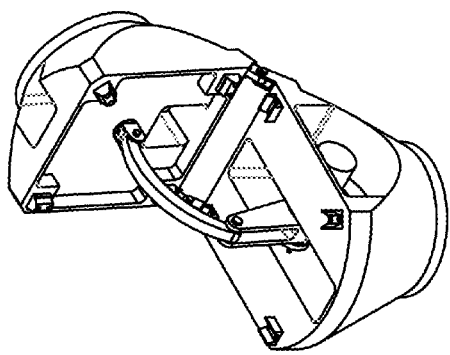
FIG. 3C depicts an isometric view of the example latching hinge of FIG. 3A in a further semi-hinge-closed condition.
Figure 3B:
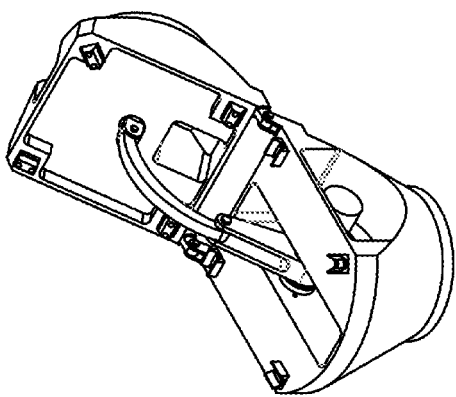
FIG. 3B depicts an isometric view of the example latching hinge of FIG. 3A in a semi-hinge-closed condition.
Figure 3E:
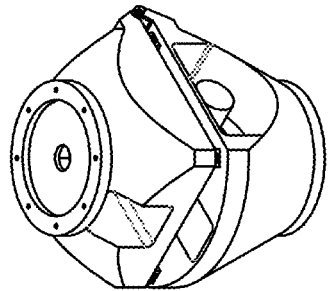
FIG. 3E depicts an isometric view of the example latching hinge of FIG. 3A in a hinge-closed condition.
Figure 3D:
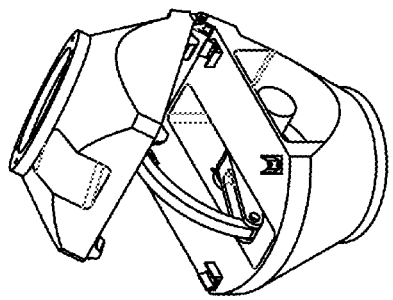
FIG. 3D depicts an isometric view of the example latching hinge of FIG. 3A in a further semi-hinge-closed condition.
Figure 3A:
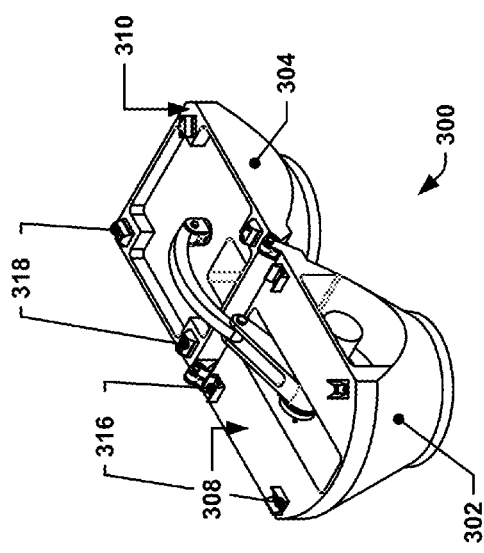
FIG. 3A depicts an isometric view of another example of a latching hinge in a hinge-open condition.

FIG. 3A depicts an isometric view of another example of a latching hinge in a hinge-open condition. The latching hinge 300 may share some characteristics with the latching hinge 200. For example, the latching hinge 300 may include a first member 302 and a second member 304. The first member 302 may include a first interface surface 308, and the second member 304 may include a second interface surface 310. The first interface surface 308 may include one or more first contact areas 316, and the second interface surface 310 may include one or more second contact areas 318.

FIG. 3B depicts an isometric view of the example latching hinge of FIG. 3A in a semi-hinge-closed condition. In this particular implementation, a draw-bar linkage is used to pull the first member 302 and the second member 304 together, as is explained with reference to later-discussed Figures. FIG. 3C depicts an isometric view of the example latching hinge of FIG. 3A in a further semi-hinge-closed condition. FIG. 3D depicts an isometric view of the example latching hinge of FIG. 3A in a further semi-hinge-closed condition. FIG. 3E depicts an isometric view of the example latching hinge of FIG. 3A in a hinge-closed condition.

Figure 3F:
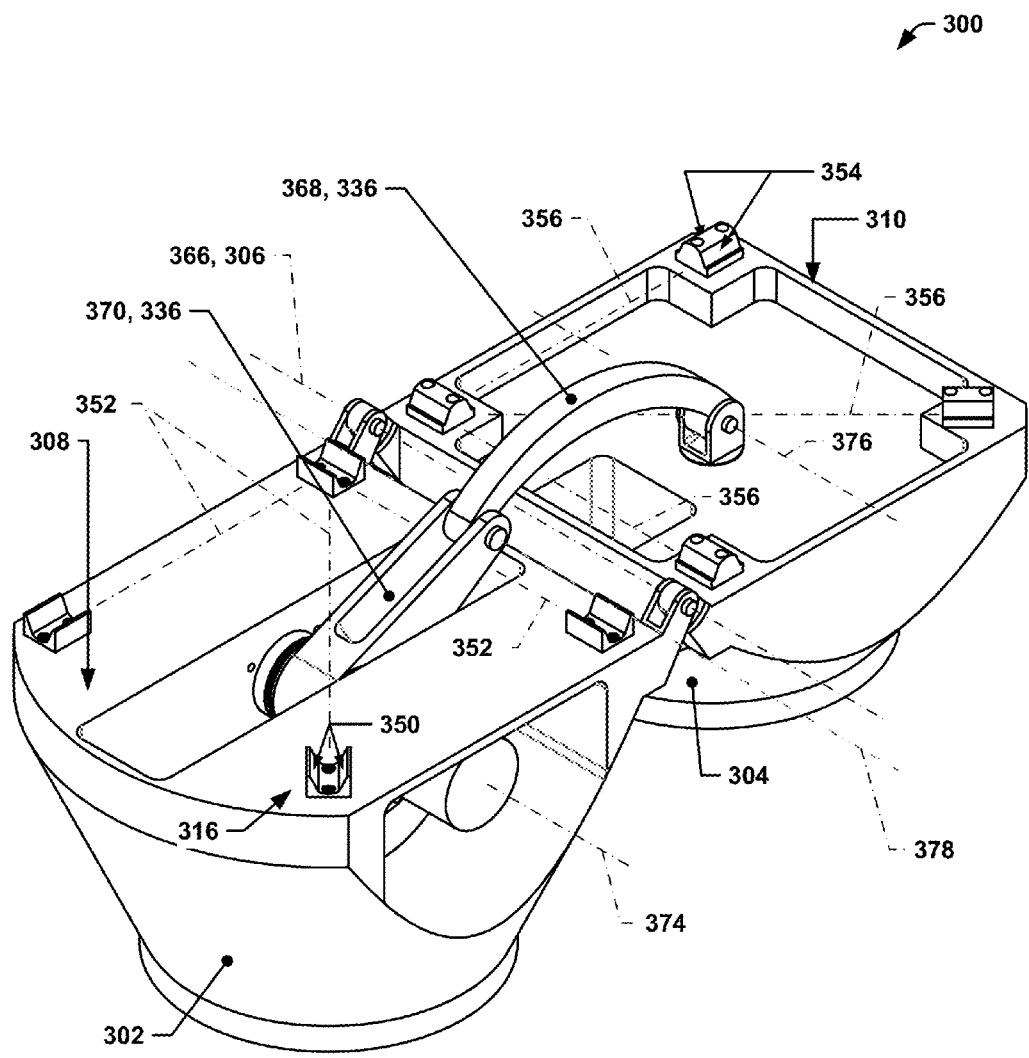
FIG. 3F depicts the view shown in FIG. 3A in greater detail.

FIG. 3F depicts the view shown in FIG. 3A in greater detail. As can be seen, the first member 302 and the second member 304 are rotatably connected with one another such that they may pivot about a hinge 306 with a pivot axis 366. The first contact areas 316 may be provided by small channel sections with first pairs of opposing slanted surfaces 350. Each first contact area 316 also has a first axis of symmetry 352. Similarly, the second contact areas 318 may be provided by small, complementary protrusions that each feature a second pair of opposing slanted surfaces 354. Each second contact area 318 also has a second axis of symmetry 356. As can be seen, the first axes of symmetry 352 may all intersect at a common point (the uppermost first contact area 316 on the page), and the second axes of symmetry 356 all intersect at a common point (the left most second contact area 318 on the page).

Also visible in FIG. 3F are two latching members 336, one of which forms a drive link 370 and the other of which forms a driven link 368. The drive link 370 and the driven link 368 form a two-bar linkage. One end of the drive link 370 is rotatably connected with the first member about a first linkage axis 374. Similarly, one end of the driven link 370 is rotatably connected with the second member about a second linkage axis 376. The other ends of the drive link 370 and the driven link 368 are rotatably connected with one another about a third linkage axis 378.

Figure 3G:
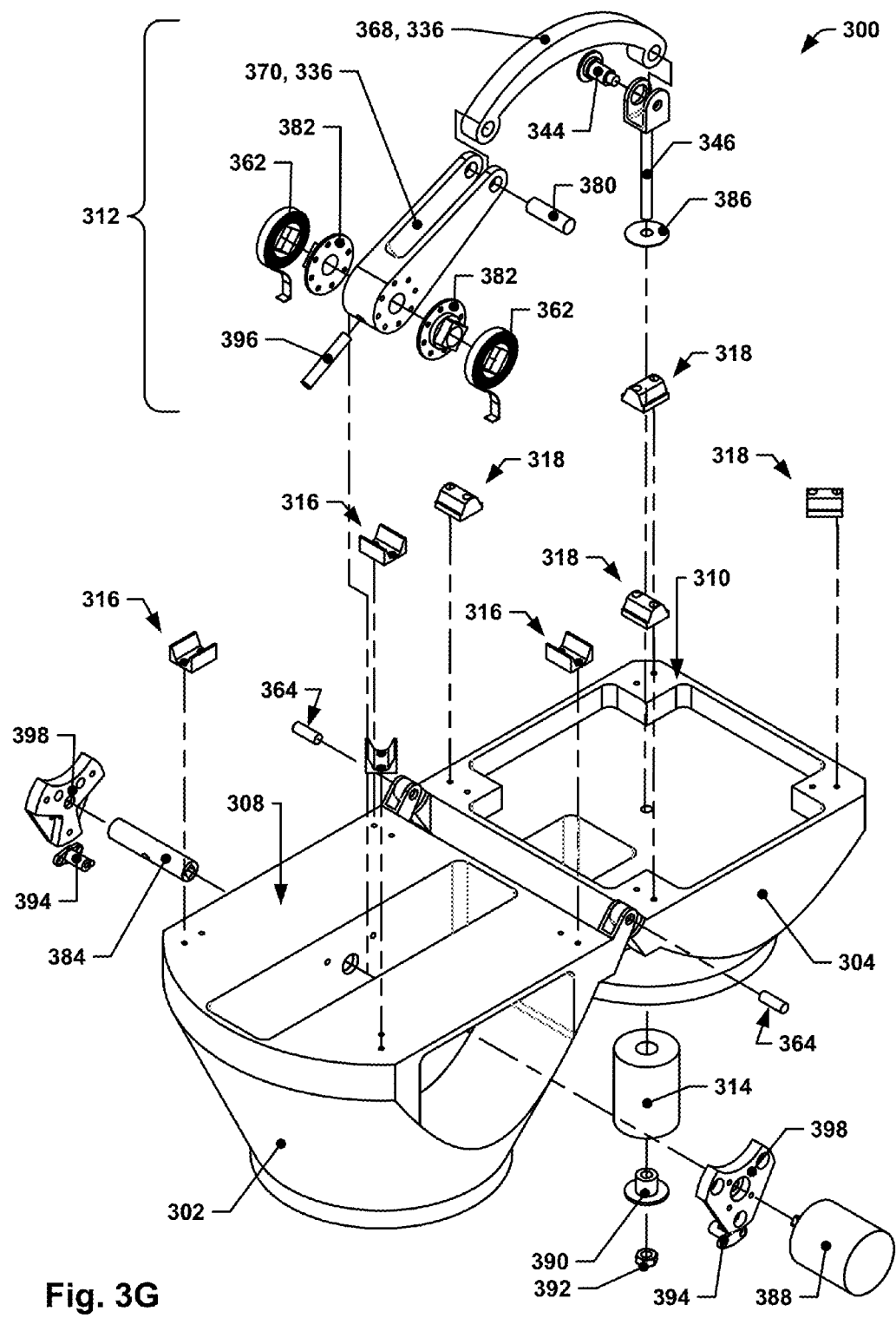
FIG. 3G depicts an isometric exploded view of the example latching hinge of FIG. 3A.

FIG. 3G depicts an isometric exploded view of the example latching hinge of FIG. 3A. Visible in FIG. 3G are the first member 302 and the second member 304, although these two components are not shown separated from one another. Pins 364 may provide a rotatable interface between the first member 302 and the second member 304. The first contact areas 216 and the second contact areas 218 are shown removed from the first interface surface 208 and the second interface surface 210, respectively. In this implementation, the first contact areas 216 and the second contact areas 218 are provided by removable components that may, for example, be bolted to the first member 202 and the second member 204, respectively, using screws (not shown). However, the contact areas may also be provided by features integral to the first member 302 and/or the second member 304.

A drive pin 384 may pass through the first member 302 and through the drive link 370. The drive pin 384 may be fixed with respect to the drive link 370, e.g., pinned via a cross-pin 396 that may be inserted through both the drive link 370 and the drive pin 384. The drive link may also be fixed with respect to spring adapters 382, which may interface with torsion spring drives 362. Once installed in the first member 302, the drive pin 384 may rotate about the first linkage axis and allow the drive link 370 to pivot about that same axis. The torsion spring drives 362 may exert torque on the drive pin 384/drive link 370. The free ends of the torsion spring drives 362 may be restrained relative to the first member 302 by torsion spring retainers 394 or other positive restraint. If needed, the torsion spring drives 362 may be tensioned after installation by removing the cross-pin 396 and rotating the drive pin 384 independently of the drive link 370—after the desired degree of tensioning is achieved, the cross-pin may be inserted or re-inserted to lock the drive pin 384 and the drive link 370 together.

The first member may also include damper mounts 398 that may provide mounting features for dampers 388 (only one is shown, although a matching damper may be used on the opposing side as well). The dampers 388 may be used to prevent too-rapid closure of the latching hinge 300 and mitigate inertial effects. The dampers, for example, may be rotational dampers that provide damping to the drive pin 384 through a square-drive or hex-drive interface. Screws for attaching the damper mounts 398 are not shown.

The second member 304 may include an SMA pre-load device 314, as well as a cap 390 and a nut 392. An eccentric adapter (or, if no eccentric is used, simply an adapter) 346 may be inserted through a belleville washer 386, the first member 302, the SMA pre-load device 314, and the cap 390 and then secured using the nut 392. The eccentric adapter may serve at least two purposes—one is to provide a load path for locking hinge pre-load, and the other is to provide mounting features for eccentric 344. This stack of components may provide a pre-load mechanism where the SMA pre-load device 314, when transitioned to an expanded state, draws the eccentric adapter 346 further into the first member 302. The Belleville washer 386 may serve as a compliant gap-filling component that prevents the eccentric adapter 346 from rattling or other unconstrained movement. The Belleville washer 386 may compress when the eccentric adapter is drawn into the first member 302.

The eccentric 304 may pass through one end of the driven link 368 to form a rotational joint about the second linkage axis 376. A linkage pin 380 may rotatably connect the opposing end of the driven link 368 with the free end of the drive link 370 about the third linkage axis 378. The joined drive link 370 and the driven link 368, as well as other various components associated with these components, may form a latch mechanism 312.

Figure 3H:
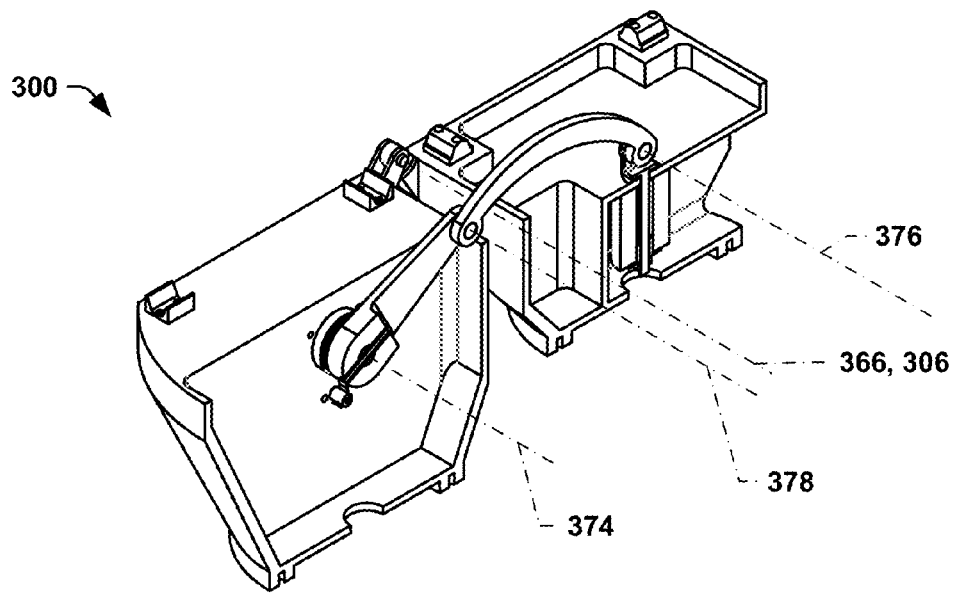
FIG. 3H depicts a sectioned version of FIG. 3A.
Figure 3I:
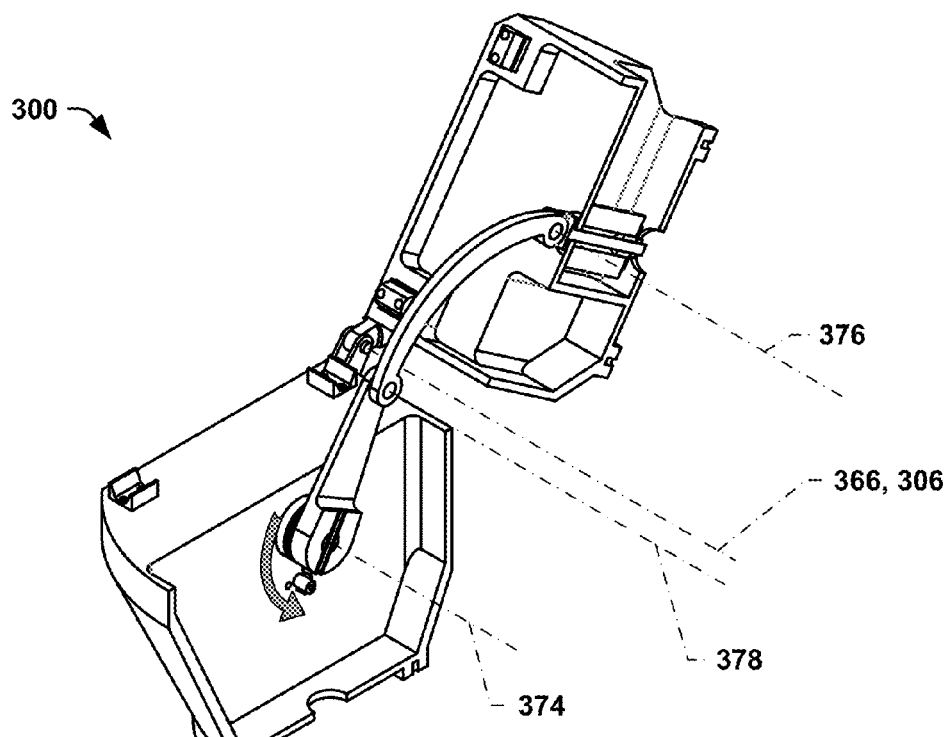
FIG. 3I depicts a sectioned version of FIG. 3B.

FIG. 3H depicts a sectioned version of FIG. 3A. FIG. 3I depicts a sectioned version of FIG. 3B. As can be seen, the drive link 370 has been rotated counter-clockwise between FIG. 3H and FIG. 3I and the resulting movement of the free end of the drive link 370 has caused the third linkage axis 378 to rotate away from the pivot axis 366. As a result, the second member 304 has started to rotate towards the first member 302.

Figure 3J:
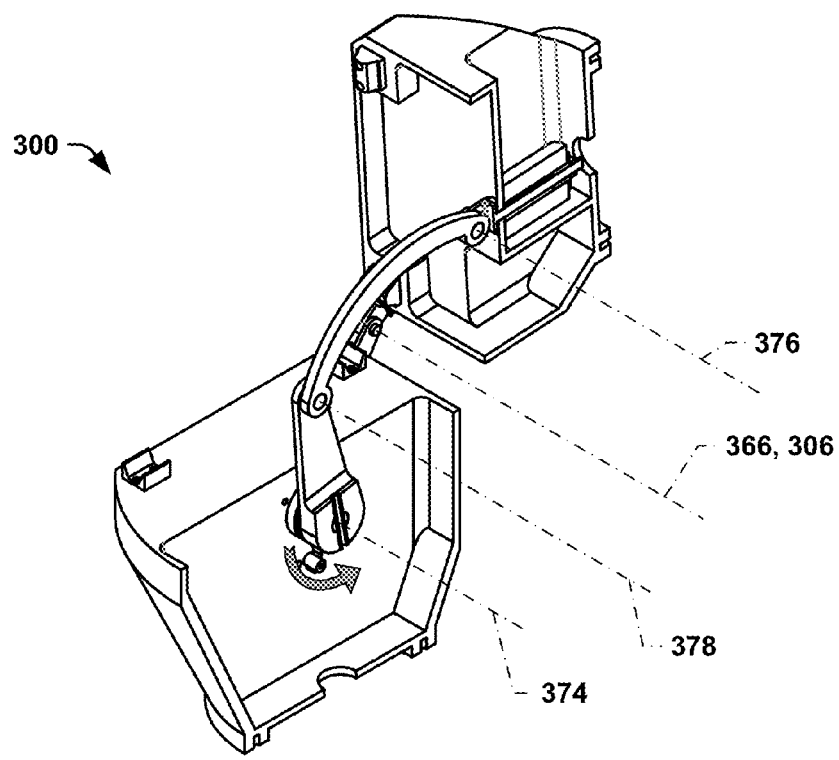
FIG. 3J depicts a sectioned version of FIG. 3C.

FIG. 3J depicts a sectioned version of FIG. 3C. As can be seen, the drive link 370 has been rotated just past the "top dead center" position with respect to the drive pin 384, and the second member 304 has rotated nearly 90 degrees about the pivot axis 366.

Figure 3K:
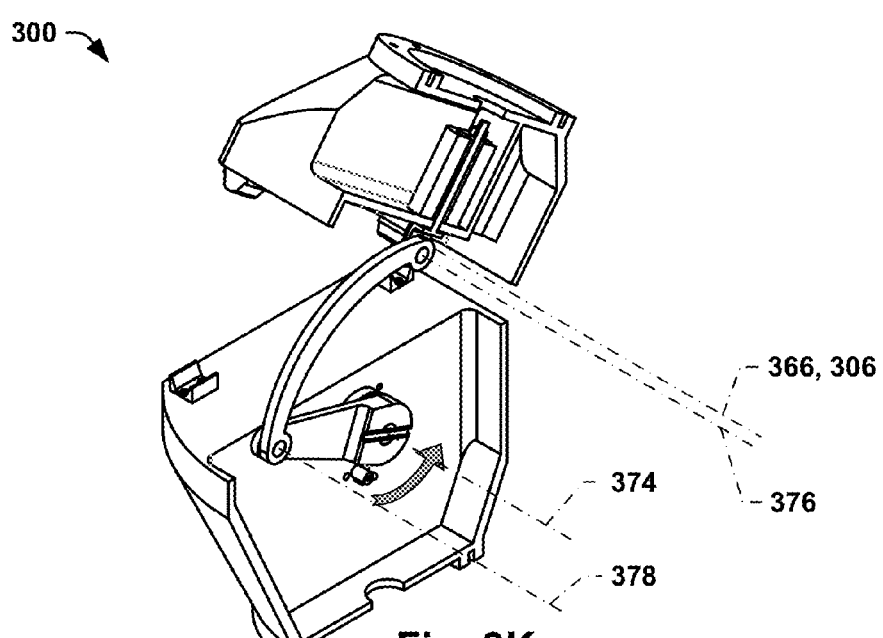
FIG. 3K depicts a sectioned version of FIG. 3D.

FIG. 3K depicts a sectioned version of FIG. 3D. In FIG. 3K, the drive link has rotated into the first member 302, and the driven link 368 has pulled the second member 304 closer to the first member 302.

Figure 3L:
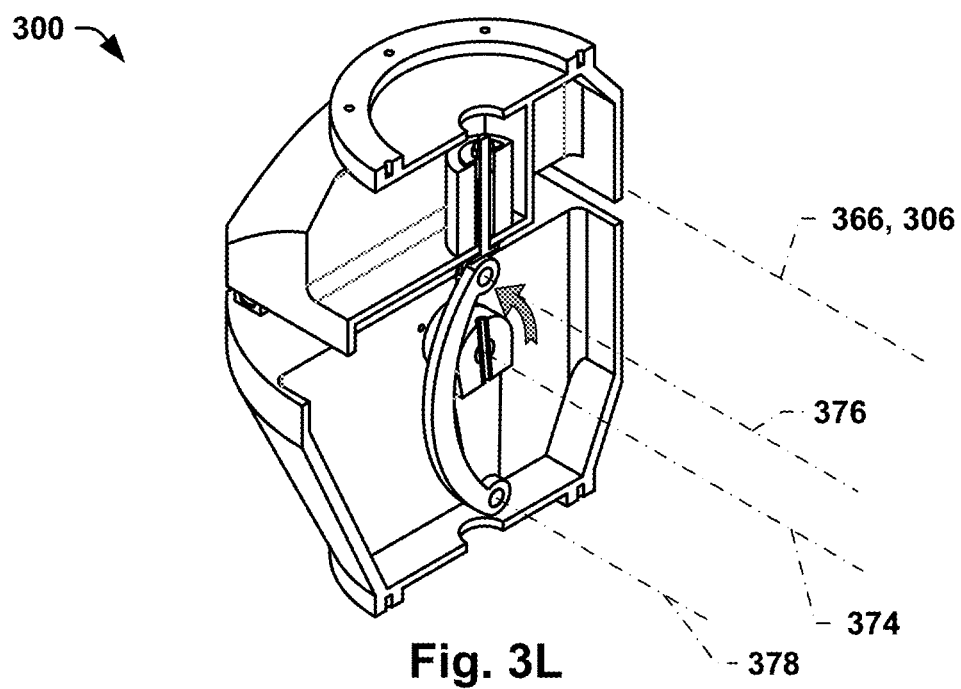
FIG. 3L depicts a sectioned version of FIG. 3E.

FIG. 3L depicts a sectioned version of FIG. 3E. In FIG. 3L, the latching hinge 300 has been fully closed, and the drive link 370 has been rotated just past bottom dead center with respect to the drive pin 384. The driven link 368, in this case, has come to rest against the drive link 370 at a location near the drive pin 384. This effectively prevents further rotational movement of both the drive link 370 and the driven link 368 in the directions shown in FIGS. 3I through 3L. Additionally, since the drive link 370 has been rotated past bottom dead center, any attempt to open the latching hinge 300 will fail because any tensile load placed on the linkage pin 380 by driven link 368 will cause the drive link 368 to attempt to move further in a counterclockwise direction, which is blocked because of the contact of the driven link 368 with the drive link 370. Thus, unless rotational input in a clockwise direction is imparted to the drive pin 384, the latching hinge 300 will remain in the hinge-closed condition.

Figure 3M:
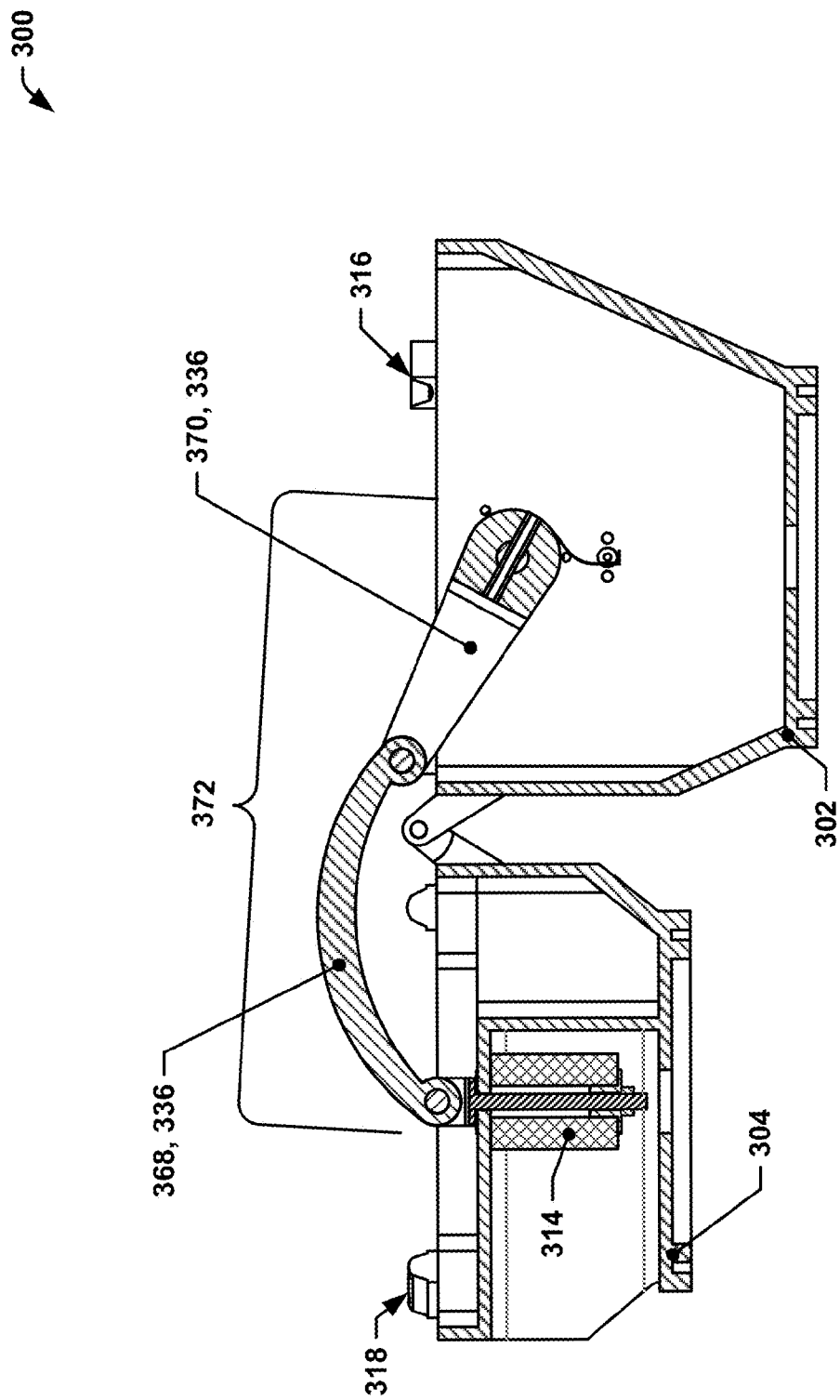
FIG. 3M depicts a side section view of the example latching hinge of FIG. 3A in the hinge-open condition.

FIG. 3M depicts a side section view of the example latching hinge of FIG. 3A in the hinge-open condition. FIG. 3N depicts a side section view of the example latching hinge of FIG. 3A in the hinge-closed condition with the SMA actuator in the unexpanded state. Also shown in FIG. 3N is a common pre-load axis 330, as well as dashed lines depicting approximate locations of the first pre-load application area 322, the second pre-load application area 324, the third pre-load application area 326, and the fourth pre-load application area 328. It is to be understood that the actual pre-load application areas will be at the bearing surfaces of the various pin interfaces in this implementation—to assist in viewing, the dashed lines indicating the pre-load application areas are somewhat offset from these bearing surfaces. The SMA pre-load device 314 is in the compressed state and has a first length 358.

It is to be understood that the first pre-load application area 322 and the second pre-load application area 324 may be separated by a first distance, the third pre-load application area 326 and the fourth pre-load application area 328 may be separate by a second distance, and that the first distance may be less than the second distance when the locking hinge 300 is in the hinge-closed condition. The difference between the first distance and the second distance may be quite small, i.e., equivalent to the amount of compliance in the various pins forming the linkage 372, but the first distance will still be less than the second distance. It is to be further understood that these observations presume that the first and second distances are measured along a common axis, e.g., along the common pre-load axis.

FIG. 3O depicts a side section view of the example latching hinge of FIG. 3A in the hinge-closed condition with the SMA actuator in the expanded state. In the expanded state, the SMA pre-load device 314 may expand to a second length 360 (the first length 358 is shown for reference as well). The expansion of the SMA pre-load device 314 draws the eccentric adapter 346 into the second member 304 and causes the driven link 368 to be placed in a state of tension, and the drive link 370 to be placed in a state of compression. In this manner, the entire latching hinge 300 may be pre-loaded.

It is to be understood that the components shown in the various views of FIGS. 3A through 3O may be arranged in different configurations from the configuration shown. In some implementations of a latching hinge, an eccentric may not be used at all. Generally speaking, the assorted pre-load application areas may all intersect, or at least be near to, a common pre-load axis.

It is also to be understood that the first and second members of latching hinges according to the concepts outlined in this disclosure may be swung through angles other than 180 degrees when transitioning between the hinge-open condition and the hinge-closed condition. For example, in the hinge-open condition, the first interface surface and the second interface surface may be at an angle with respect to one another that is less than 180 degrees.

The latching hinges discussed herein may be made from a variety of materials depending on the environments in which they are used. In the case of latching hinges for use in spacecraft, the materials used may be selected to be compatible with the pressure, thermal, and radiation environments of space. For example, some implementations of a latching hinge may largely be made from aluminum, titanium, or steel alloys, or combinations thereof. For example, the first member and the second member may be made from an aluminum alloy, whereas the pins may be made from stainless steel. Of course, the SMA pre-load device must be made from a shape-memory alloy, e.g., nitinol or other suitable SMA.

Figure 4A:
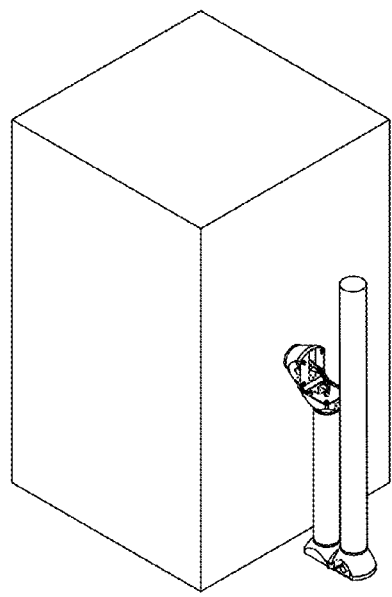
FIG. 4A depicts an isometric view of an example simplified conceptual satellite body with a folding boom structure attached via latching hinges.
Figure 4B:
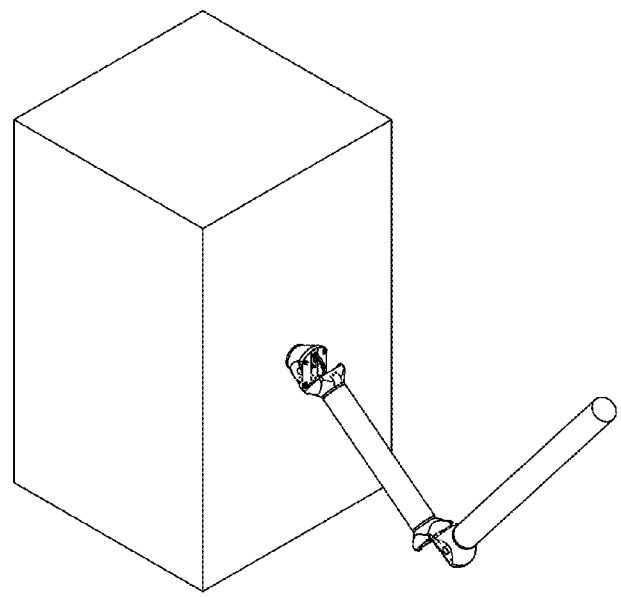
FIG. 4B depicts an isometric view of the example satellite body of FIG. 4A with the folding boom structure partially deployed.
Figure 4C:
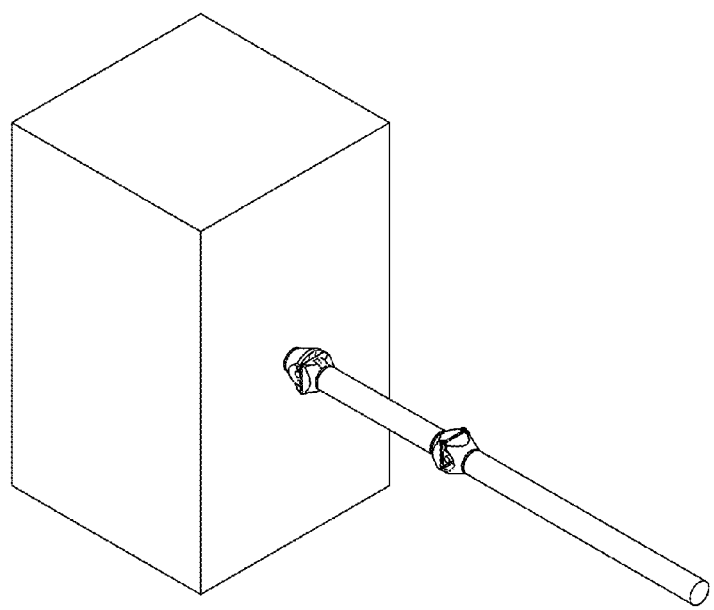
FIG. 4C depicts an isometric view of the example satellite body of FIG. 4A with the folding boom structure fully deployed.

FIGS. 4A-4C depict isometric views of an example simplified conceptual satellite body with a folding boom structure attached via latching hinges. FIG. 4A depicts an isometric view of an example simplified conceptual satellite body with a folding boom structure attached via latching hinges in the open-hinge condition. As can be seen, one latching hinge is open to 180 degrees, whereas the other (joining the boom to the satellite body), is open to 90 degrees.

FIG. 4B depicts an isometric view of the example satellite body of FIG. 4A with the folding boom structure partially deployed. In this configuration, the satellite-boom latching hinge is open to 45 degrees, and the remaining latching hinge is open to 90 degrees.

FIG. 4C depicts an isometric view of the example satellite body of FIG. 4A with the folding boom structure fully deployed. In this configuration, both latching hinges may be pre-loaded as discussed herein, and the resulting deployed boom structure may be rendered substantially more rigid than it otherwise would be.

Although several implementations of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

What is claimed is:

1. A latching hinge comprising:
a first member;
a second member rotatably coupled to the first member about a hinge such that:
in a hinge-closed condition, a first interface surface of the first member is restrained substantially parallel and proximate to a second interface surface of the second member by a latch mechanism, and
in a hinge-open condition, the first interface surface is at a substantial angle to the second interface surface; and
a shape memory alloy (SMA) pre-load device, the SMA pre-load device configured to transition from a first phase to a second phase when heated to a transformation temperature, wherein, when the SMA pre-load device is transitioned from the first phase to the second phase while the latching hinge is in the hinge-closed condition, expansion of the SMA pre-load device loads the latch mechanism so as to press one or more first contact areas on the first interface surface into substantially gapless contact with one or more corresponding second contact areas on the second interface surface.

2. The latching hinge of claim 1, wherein the SMA pre-load device is further configured such that expansion of the SMA pre-load device when the latching hinge is in the hinge-closed condition loads the latch mechanism primarily along an axis substantially perpendicular to a hinge axis of the hinge.

3. The latching hinge of claim 1, wherein:
the SMA pre-load device has a first length in the first phase and expands to a second length in the second phase, and
the SMA pre-load device is positioned such that the expansion of the SMA pre-load device induces a pre-load in the latch mechanism without plastic deformation of the latch mechanism.

4. The latching hinge of claim 1, wherein the SMA pre-load device uses a one-way SMA.

5. The latching hinge of claim 1, wherein the SMA pre-load device includes a thick-wall tube of SMA and an electrical heating element configured to heat the SMA to the transformation temperature.

6. The latching hinge of claim 1, wherein:
the first member includes a first pre-load application area substantially centered with respect to the one or more first contact areas;
the second member includes a second pre-load application area substantially centered with respect to the one or more second contact areas, wherein the first pre-load application area and the second pre-load application area are spaced apart by a first distance when the latching hinge is in the hinge-closed condition;
the latch mechanism includes:
a third pre-load application area,
a fourth pre-load application area, and
one or more latching members joining the third pre-load application area and the fourth pre-load application area, wherein, when the latching hinge is in the hinge-closed condition:
the third pre-load application area and the fourth pre-load application area are spaced apart by a second distance larger than the first distance when the SMA pre-load device is in the first phase;
the latch mechanism and SMA pre-load device are positioned such that the first pre-load application area, the second pre-load application area, the third pre-load application area, the fourth pre-load application area, and the SMA pre-load device are all substantially centered on a common pre-load axis, the first pre-load application area faces the third pre-load application area, and the second pre-load application area faces the fourth pre-load application area; and
the SMA pre-load device, when transitioned from the first phase to the second phase, increases in length along the common pre-load axis by an amount greater than any inter-component compliance in a direction parallel to the common pre-load axis and between the first pre-load application area and the third pre-load application area added to any inter-component compliance in the direction parallel to the common pre-load axis and between the second pre-load application area and the fourth pre-load application area.

7. The latching hinge of claim 6, wherein:
the first pre-load application area faces away from the first interface surface,
the second pre-load application area faces away from the second interface surface,
the third pre-load application area and the fourth pre-load application area face each other, and
the latch mechanism is configured to allow the third pre-load application area to swing clear of the first pre-load application area while the latching hinge is transitioned between the hinge-open condition and the hinge-closed condition.

8. The latching hinge of claim 7, wherein:
the latch mechanism has a latching member and the latching member, the third pre-load application area, and the fourth pre-load application area form a C-shape with the third pre-load application area and the fourth pre-load application area located along horizontal portions of the C and the one or more latching members provided by a vertical portion of the C, and the latch mechanism is rotatably connected with the second member.

9. The latching hinge of claim 8, further comprising a flexible beam spring, wherein:
the latch mechanism is connected at an end near the fourth pre-load application area to the flexible beam spring,
the flexible beam spring connected to the second member, and
the flexible beam spring is configured to allow the latch mechanism to rotate into an unlatched position when the flexible beam spring is in an elastically unstable state and to cause the latch mechanism member to rotate into a latched position when the flexible beam spring relaxes into an elastically stable state.

10. The latching hinge of claim 6, further comprising an eccentric, wherein the eccentric is positioned, when the latching hinge is in the hinge-closed condition, in a location intersecting the common pre-load axis and selected from the group consisting of a location between the first pre-load application area and the third pre-load application area and a location between the second pre-load application area and the fourth pre-load application area.

11. The latching hinge of claim 6, wherein, when the latching hinge is in the hinge-closed condition, the SMA pre-load device is positioned in a location selected from the group consisting of a location between the first pre-load application area and the third pre-load application area and a location between the second pre-load application area and the fourth pre-load application area.

12. The latching hinge of claim 6, wherein:
the one or more first contact areas include at least three substantially symmetric first pairs of opposing, slanted surfaces,
each of the substantially symmetric first pairs of opposing, slanted surfaces has a first axis of symmetry,
the first axes of symmetry for the at least three substantially symmetric first pairs of opposing, slanted surfaces intersect at a first substantially common location,
the one or more second contact areas include at least three substantially symmetric second pairs of opposing, slanted surfaces,
each of the substantially symmetric second pairs of opposing, slanted surfaces has a second axis of symmetry, and
the second axes of symmetry for the at least three substantially symmetric second pairs of opposing, slanted surfaces intersect at a second substantially common location.

13. The latching hinge of claim 12, wherein at least two of the first axes of symmetry are orthogonal to one another.

14. The latching hinge of claim 12, wherein:
the one or more first contact areas include at least four substantially symmetric first pairs of opposing, slanted surfaces,
the fourth substantially symmetric first pair of opposing, slanted surfaces also has a first axis of symmetry,
the first axes of symmetry for the at least four substantially symmetric first pairs of opposing, slanted surfaces intersect at the fourth substantially symmetric first pair of opposing, slanted surfaces,
the one or more second contact areas include at least four substantially symmetric second pairs of opposing, slanted surfaces,
the fourth substantially symmetric second pair of opposing, slanted surfaces also has a second axis of symmetry, and
the second axes of symmetry for the at least four substantially symmetric second pairs of opposing, slanted surfaces intersect at the fourth substantially symmetric second pair of opposing, slanted surfaces.

15. The latching hinge of claim 1, further comprising a torsion spring drive mechanism substantially centered on a pivot axis of the hinge, the torsion spring drive mechanism configured to urge the first member and the second member to rotate about the pivot axis such that the first interface surface and the second interface surface come into contact.

16. The latching hinge of claim 1, wherein the one or more latching members include a driven link and a drive link arranged to form a linkage, wherein:
the drive link is configured to pivot about a first linkage axis that is fixed with respect to the first member,
the driven link is configured to pivot about a second linkage axis that is substantially fixed with respect to the second member,
the driven link and the drive link are rotatably connected to one another about a third linkage axis, and
the linkage is configured such that rotation of the drive link about the first linkage axis when the locking hinge is in the hinge-open condition causes the drive link to:
rotate into the first member,
draw the driven link into the first member, and
draw the first member and the second member towards each other such that the locking hinge transitions from the hinge-open condition to the hinge-closed condition.

17. The latching hinge of claim 16, wherein the linkage is configured so that a portion of the driven link contacts an end of the drive link near the first linkage axis when the latching hinge is in the closed hinge condition and the SMA pre-load device is in the second phase.

18. The latching hinge of claim 16, wherein the linkage is configured so that when the latching hinge is transitioned from the hinge-open condition to the hinge-closed condition, the third linkage axis passes through and past bottom dead center with respect to an axis passing through the first linkage axis and the second linkage axis.

19. The latching hinge of claim 1, wherein the latch mechanism is configured to restrain the first member and the second member from rotating relative to each other after the first interface surface and the second interface surface come into contact by applying a motion constraint along an axis substantially centered on the first interface surface and the second interface surface.

20. A spacecraft comprising:
a main body;
a boom; and
the latching hinge of claim 1, the boom coupled to the main body by the latching hinge and the spacecraft configured to transition from a stowed state to a deployed state by releasing the boom from the stowed state, rotating the boom so as to close the latching hinge, engaging the latching mechanism, and pre-loading the latching mechanism by transitioning the SMA pre-load device from the first phase to the second phase.

* * * * *